US011057737B2

(12) United States Patent
He et al.

(10) Patent No.: US 11,057,737 B2
(45) Date of Patent: Jul. 6, 2021

(54) INDOOR POSITIONING FOR MOBILE DEVICES

(71) Applicant: GOOGLE LLC, Mountain View, CA (US)

(72) Inventors: Fei He, Sunnyvale, CA (US); Jing J. Liang, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/714,631

(22) Filed: Dec. 13, 2019

(65) Prior Publication Data

US 2021/0058740 A1 Feb. 25, 2021

Related U.S. Application Data

(60) Provisional application No. 62/891,084, filed on Aug. 23, 2019.

(51) Int. Cl.
| | |
|---|---|
| *H04W 24/00* | (2009.01) |
| *H04W 4/02* | (2018.01) |
| *G01S 5/00* | (2006.01) |
| *H04B 17/318* | (2015.01) |
| *H01Q 1/12* | (2006.01) |
| *H01Q 3/24* | (2006.01) |
| *H04W 64/00* | (2009.01) |
| *H04W 16/28* | (2009.01) |
| *H04W 4/33* | (2018.01) |

(52) U.S. Cl.
CPC ........... *H04W 4/026* (2013.01); *G01S 5/0027* (2013.01); *H01Q 1/1257* (2013.01); *H01Q 3/24* (2013.01); *H04B 17/318* (2015.01); *H04W 4/33* (2018.02); *H04W 16/28* (2013.01); *H04W 64/003* (2013.01)

(58) Field of Classification Search
CPC ..... H04W 64/00; H04W 4/029; H04W 4/025; H04W 24/02; H04W 64/006; H04W 36/32; H04W 28/04; H04W 88/08; H04W 36/00; H04W 4/027
USPC ...... 455/456.6, 230, 440, 456.2, 456.1, 517, 455/67.11, 41.2, 456.5, 435.3
See application file for complete search history.

(56) References Cited

U.S. PATENT DOCUMENTS

| | | |
|---|---|---|
| 9,629,171 B2 | 4/2017 | Roy et al. |
| 2011/0201357 A1 | 8/2011 | Garrett et al. |

(Continued)

FOREIGN PATENT DOCUMENTS

WO 2018203332 A1 11/2018

OTHER PUBLICATIONS

International Search Report and Written Opinion of International Application No. PCT/US2020/047251, dated Nov. 13, 2020, 16 pp.

*Primary Examiner* — Joseph Arevalo
(74) *Attorney, Agent, or Firm* — Shumaker & Sieffert, P.A.

(57) ABSTRACT

Systems and techniques are provided for indoor positioning for mobile devices. An orientation of a mobile device may be determined. An angle of a line-of-sight between the mobile device and the base station may be determined based on a peak received signal strength of a signal from the base station at a beamforming antenna of the mobile device. A distance between the mobile device and the base station may be determined based on the peak received signal strength. The mobile device may calculate the location of the mobile device using the measured orientation, the angle of the line-of-sight, and the distance between the mobile device and the base station, and a location of the base station.

18 Claims, 14 Drawing Sheets

(56) References Cited

U.S. PATENT DOCUMENTS

| | | | |
|---|---|---|---|
| 2013/0189929 A1 | 7/2013 | Takahashi et al. | |
| 2018/0049154 A1 | 2/2018 | Choi et al. | |
| 2018/0283872 A1* | 10/2018 | Robinson | G06Q 10/08 |
| 2019/0199457 A1* | 6/2019 | Chopra | H04B 17/318 |
| 2019/0304334 A1* | 10/2019 | Jiang | A61B 5/0205 |
| 2020/0010051 A1* | 1/2020 | Durnov | B60R 25/252 |
| 2020/0025911 A1* | 1/2020 | Rappaport | H01Q 21/29 |
| 2020/0109954 A1* | 4/2020 | Li | G01C 21/32 |
| 2020/0112360 A1* | 4/2020 | Krunz | H04B 7/086 |
| 2020/0182995 A1* | 6/2020 | Zeng | G01S 13/723 |

\* cited by examiner

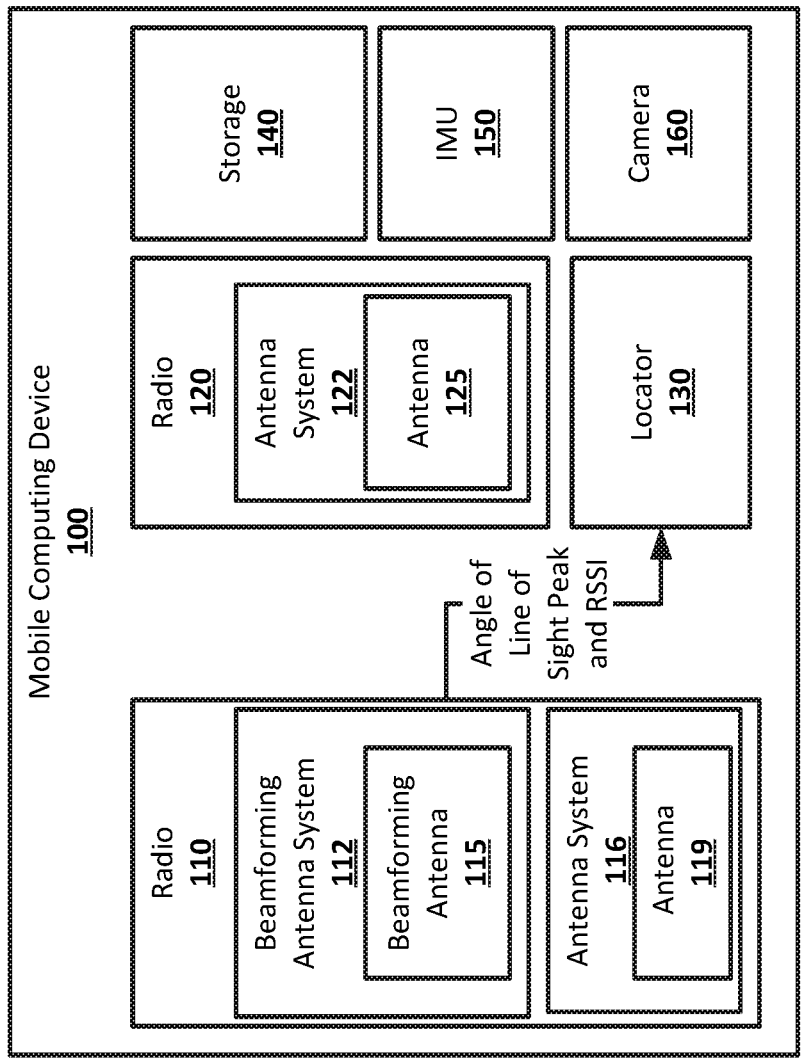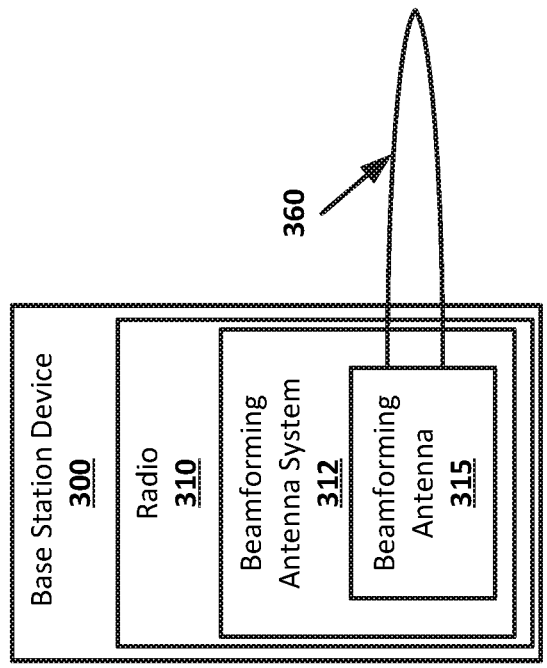
FIG. 3B

INDOOR POSITIONING FOR MOBILE DEVICES

BACKGROUND

It may difficult for mobile devices to determine their own location within indoor environments. Indoor environments may have strong wall-penetration loss, multipath reflections, and code/carrier-phase delay distortions which may reduce the positioning accuracy of satellite-based positioning technologies. Multipath reflections may reduce the accuracy of indoor positioning using WiFi or Bluetooth. Additional infrastructure, such as RTT-enabled WiFi APs, or Bluetooth beacon stations, may need to be deployed in advance in conjunction with with site-surveys for anchor-point locations.

BRIEF SUMMARY

According to an embodiment of the disclosed subject matter, an orientation of a mobile device may be determined. An angle of a line-of-sight between the mobile device and the base station may be determined based on a peak received signal strength of a signal from the base station at a beamforming antenna of the mobile device. A distance between the mobile device and the base station may be determined based on the peak received signal strength. The mobile device may calculate the location of the mobile device using the measured orientation, the angle of the line-of-sight, and the distance between the mobile device and the base station, and a location of the base station.

The signal from the base station may be a broadcast signal. The beamforming antenna of the mobile device may be scanned through a range of angles to determine which angle has the peak received signal strength at the beamforming antenna.

The broadcast signal may be a 5G NR mmWave signal.

The signal from the base station may be a beamformed signal scanned through a range of angles. A beamforming antenna system of the mobile device may determine which angle has the peak received signal strength at the beamforming antenna.

To determine an orientation of the mobile device, the orientation of the mobile device may be measured using an IMU of the mobile device.

To determine an orientation of the mobile device, the orientation of the mobile device may be measured using a camera of the mobile device, e.g. using visual odometry on an image from a camera of the mobile device.

For each of a number of base stations, an angle of a line-of-sight between the mobile device and the respective base station may be determined based on a peak received signal strength of a signal from the respective base station at a beamforming antenna of the mobile device and a distance between the mobile device and the respective base station may be determined based on the peak received signal strength. The mobile device may construct an error matrix using the measured orientation, the angle of the line-of-sight, the distance between the mobile device and the respective base station, and a location of the respective base station for each of the number of base stations. A location of the mobile device may be calculated by using a weighted least squares optimization on the error matrix.

Errors of the error matrix may be weighted based on uncertainties of the peak received signal strengths and angles of line-of-sight for the number of base stations.

Determining of the angle of the line-of-sight may be performed using a beamforming algorithm based on a signal covariant matrix.

A mobile device may include one or more processors and a memory. The mobile device may be configured to determine an orientation of the mobile device, determine an angle of a line-of-sight between the mobile device and the base station based on a peak received signal strength of a signal from the base station at a beamforming antenna of the mobile device, determine a distance between the mobile device and the base station based on the peak received signal strength, and calculate, by the mobile device, the location of the mobile device using the measured orientation, the angle of the line-of-sight, and the distance between the mobile device and the base station, and a location of the base station.

The mobile device may include an IMU. The mobile device may be configured to determine an orientation of the mobile device by measuring the orientation of the mobile device using the IMU.

The mobile may include a camera. The mobile device may be configured to determine an orientation of the mobile device by measuring the orientation of the mobile device using the camera, e.g., using visual odometry on an image from the camera.

The beamforming antenna of the mobile device may be configured to receive a 5G NR mmWave signal.

A system may include a base station and a mobile device including one or more processors and a memory storing instructions which, when executed by the one or more processors, may cause the one or more processors perform operations including determining an orientation of the mobile device, determining an angle of a line-of-sight between the mobile device and the base station based on a peak received signal strength of a signal from the base station at a beamforming antenna of the mobile device, determining a distance between the mobile device and the base station based on the peak received signal strength, calculating, by the mobile device, the location of the mobile device using the measured orientation, the angle of the line-of-sight, and the distance between the mobile device and the base station, and a location of the base station.

The signal from the base station may be a broadcast signal. The instructions may further cause the one or more processors to perform including scanning the beamforming antenna of the mobile device through a range of angles to determine which angle has the peak received signal strength at the beamforming antenna.

The broadcast signal may be a 5G NR mmWave signal.

The signal from the base station may be a beamformed signal scanned through a range of angles. The beamforming antenna system of the mobile device may be configured to determine which angle has the peak received signal strength at the beamforming antenna.

The system may include a number of base stations. The instructions may further cause the one or more processors to perform operations including, for each of the number of base stations, determining an angle of a line-of-sight between the mobile device and the respective base station based on a peak received signal strength of a signal from the respective base station at a beamforming antenna of the mobile device and determining a distance between the mobile device and the respective base station based on the peak received signal strength, constructing, by the mobile device, an error matrix using the measured orientation, the angle of the line-of-sight, the distance between the mobile device and the respective base station, and a location of the respective base station for each of the number of base stations, and calculating a location of the mobile device by using a weighted least squares optimization on the error matrix.

The instructions may further cause the one or more processors to perform operations including weighting errors of the error matrix based on uncertainties of the peak received signal strengths and angles of line-of-sight for the number of the base stations.

The instructions may further cause the one or more processors to perform operations including determining the angle of the line-of-sight using a beamforming algorithm based on a signal covariant matrix.

A location of a mobile device in a reference frame may be determined. The orientation of the mobile device may be determined with respect to the reference frame. A relative location of the mobile device with respect to a base station may be determined using a beamforming antenna. The location of the mobile device may be calculated in the reference frame using the determined orientation and relative location, and a location of the base station in the reference frame.

A computer program product may include instructions which, when executed by one or more processors, cause the one or more processors to perform operations including measuring an orientation of the mobile device with respect to a reference frame, measuring a relative location of the mobile device with respect to a base station using a beamforming antenna, calculating the location of the mobile device in the reference frame using the measured orientation and relative location, and a location of the base station in the reference frame.

A computer program product may include instructions which, when executed by one or more processors, cause the one or more processors to perform operations including determining an orientation of the mobile device, determining an angle of a line-of-sight between the mobile device and the base station based on a peak received signal strength of a signal from the base station at a beamforming antenna of the mobile device, determining a distance between the mobile device and the base station based on the peak received signal strength, and calculating, by the mobile device, the location of the mobile device using the measured orientation, the angle of the line-of-sight, and the distance between the mobile device and the base station, and a location of the base station.

According to an embodiment of the disclosed subject matter, a means for determining an orientation of the mobile device, a means for determining an angle of a line-of-sight between the mobile device and the base station based on a peak received signal strength of a signal from the base station at a beamforming antenna of the mobile device, a means for determining a distance between the mobile device and the base station based on the peak received signal strength, a means for calculating, by the mobile device, the location of the mobile device using the measured orientation, the angle of the line-of-sight, and the distance between the mobile device and the base station, and a location of the base station, a means for measuring the orientation of the mobile device using an IMU of the mobile device, a means for measuring the orientation of the mobile device using visual odometry on an image from a camera of the mobile device, a means for, for each of a number of base stations, determining an angle of a line-of-sight between the mobile device and the respective base station based on a peak received signal strength of a signal from the respective base station at a beamforming antenna of the mobile device and determining a distance between the mobile device and the respective base station based on the peak received signal strength, a means for constructing, by the mobile device, an error matrix using the measured orientation, the angle of the line-of-sight, the distance between the mobile device and the respective base station, and a location of the respective base station for each of the number of base stations, a means for calculating a location of the mobile device by using a weighted least squares optimization on the error matrix, a means for weighting errors of the error matrix based on uncertainties of the peak received signal strengths and angles of line-of-sight for the number of the base stations, and a means for scanning the beamforming antenna of the mobile device through a range of angles to determine which angle has the peak received signal strength at the beamforming antenna, are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3B shows an example arrangement suitable for indoor positioning for mobile devices according to an implementation of the disclosed subject matter.

DETAILED DESCRIPTION

Figure 1:
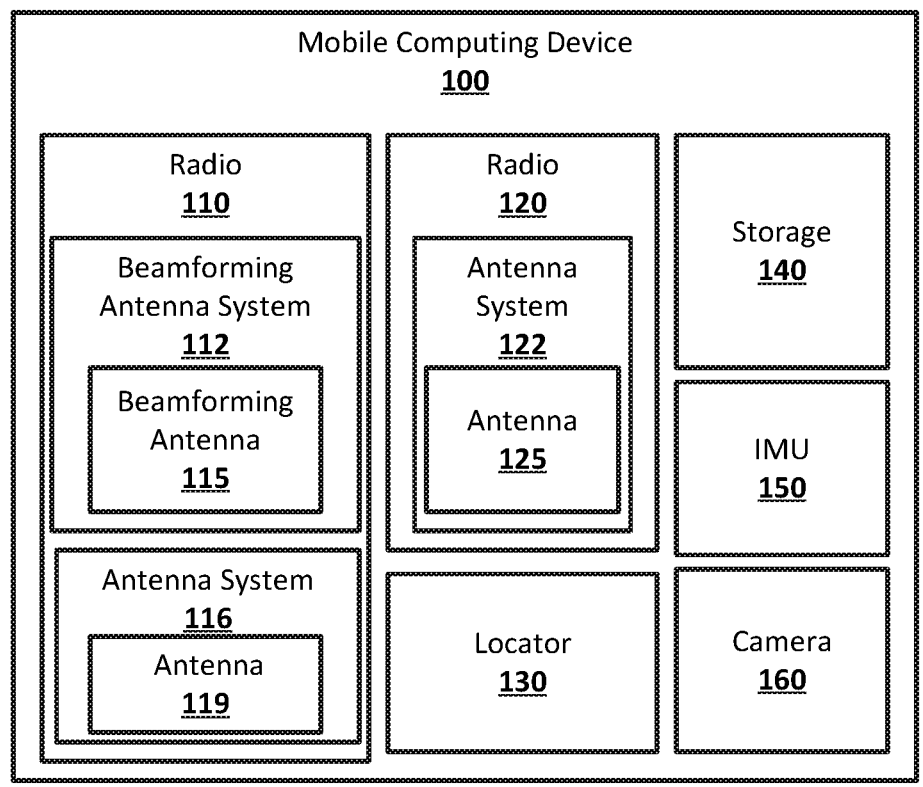
FIG. 1 shows an example system suitable for indoor positioning for mobile devices according to an implementation of the disclosed subject matter.

According to embodiments disclosed herein, indoor positioning for mobile devices may allow for a mobile device to determine its location in an indoor environment using a beamforming antenna and sensor fusion or visual odometry. A mobile device may be a computing device that may include a beamforming antenna as part of a beamforming antenna system. The mobile device may determine its current orientation using built-in sensors, such as a compass and/or an inertial measurement unit (IMU) that may include an accelerometer, gyroscope, and/or magnetometer, and/or by using images from a built-in camera for visual odometry. The beamforming antenna may be operated in a receiving mode and may be scanned through a range of angles to determine which angle has a line-of-sight peak to a base station based on received signal strength indicator (RSSI) measurements. RSSI mapping may be used to determine the distance between the mobile device and the base station. The mobile device may obtain the location of the base station through a data communication link established using the beamforming antenna system or another antenna system of the mobile device. The location of the base station, angle of the line-of-sight peak to the base station, distance between the mobile device and the base station, and orientation of the mobile device may be used to determine the location of the mobile device. The location may be determined in 2-dimensions. The mobile device may determine its location by finding the angle of the line-of-sight peak and the distance to only one single base station. It is not necessary to deploy additional hardware at predetermined locations, such as additional beacon devices. However, the mobile device may improve the accuracy of its determined location by finding the angle of the line-of-sight peak and the distance to multiple base stations and obtaining the locations of those base stations. An error matrix may be constructed using the locations of the base stations, the angles of the line-of-sight peaks, the distances to the base stations, and the orientation of the mobile device. Weighting may be added to the determined errors based on RSSI signal uncertainties and uncertainties in the angles of the line-of-sight peaks. A weighted-least-squares optimization may be used on the error matrix to estimate the location of the mobile device.

A mobile device may have multiple antenna systems. The mobile device may be, for example, a smartphone, tablet, laptop, smartwatch or other mobile computing device, or may be any other computing device that may include multiple radios and antenna systems for communication over different wireless links. For example, a smartphone may include a 5G NR radio, a 4G LTE radio, and a Wi-Fi radio. The 5G radio may include an antenna system for use in two frequency ranges, frequency range 1 (FR1) which may include sub-6 GHz frequency bands, and frequency range 2 (FR2), which may include bands above 24 GHz including frequencies in the millimeter wave (mmWave) band. The 5G radio may include a beamforming antenna system for FR2, such as, for example, a phased array antenna. The antenna systems for FR1, 4G LTE, and Wi-Fi may be non-beamforming antenna systems.

The mobile device may include sensors that may provide data that may be used to determine the orientation of the mobile device. An IMU of the mobile device may include an accelerometer, gyroscope, and/or magnetometer. Data provided by the IMU may be used to determine the orientation of the mobile device, and the orientation of the beamforming antenna and its radio. The determined orientation may be determined in any suitable reference frame. For example, the orientation of the mobile device may be expressed as an angle $\Phi_{sen}$ relative to a reference frame based on the latitude and longitude lines of the earth, with the X-axis of the reference frame running parallel to the lines of latitude and Y-axis running parallel to the lines of longitude, and an origin at the center of the beamforming antenna of the mobile device.

The mobile device may include a camera. Visual odometry may be used on images from the camera to determine the orientation of the mobile device. For example, an image from the camera may be analyzed for features, such as the presence of a floor, walls, and a ceiling. The location of these features in the image, and the location of the camera on the mobile device, may be used to determine the orientation of the mobile device, and determine the orientation of the beamforming antenna. The determined orientation may be determined in any suitable reference frame. For example, the orientation of the mobile device may be expressed as an angle $\Phi_{sen}$ relative to a reference frame based on the latitude and longitude lines of the earth, with the X-axis of the reference frame running parallel to the lines of latitude and Y-axis running parallel to the lines of longitude, and an origin at the center of the beamforming antenna of the mobile device.

The beamforming antenna may be operated in a receiving mode and may be scanned through a range of angles to determine which angle has a line-of-sight peak to a base station based on RSSI measurements. The mobile device may, for example, scan the beamforming antenna through a range of angles by changing the weighting given to signals received by different individual antenna elements of a phased array antenna, changing the angle at which the beamforming antenna system is most sensitive to signals broadcast from a base station. For example, the beamforming antenna may be scanned through all of the angles in a sphere around the beamforming antenna, 360 degrees through the x-y plane and the y-z plane with origins at the center of the beamforming antenna, or may be scanned through any suitable subset of these angles. The scanning may go through the range of angles at any suitable granularity. At each angle, the RSSI of the beamforming antenna system of the mobile device may be measured. For example, the mobile device may scan the beamforming antenna for 5G NR FR2 receiving 5G NR FR2 broadcast signals from a 5G base station across a range of angles, and the RSSI of the 5G NR FR2 antenna system and radio may be measured at each angle. The angle at which the maximum RSSI value is measured may be the angle $\Phi_{peak}$ of the line-of-sight peak to the base station. The angle $\Phi_{peak}$ may be determined in the reference frame used by the beamforming antenna system, which may, for example, have its origin at the center of the beamforming antenna, an X-axis parallel to the width of the mobile device, and a Y-axis parallel to the length of the mobile device Frequencies in the mmWave band may allow particularly accurate measurements in comparison to other frequency ranges.

In some implementations, the beamforming antenna may be operated in a receiving mode and the base station may generate a beam that may be scanned through a range of angles to determine which angle has a line-of-sight peak from the base station based to the mobile device based on RSSI measurements. The base station may, for example, generate a beam using a beamforming antenna of the base station. The beam may be swept through a range of angles. For example, the beam may be swept through all of the angles in a sphere around the beamforming antenna, 360 degrees through the x-y plane and the y-z plane with origins at the center of the beamforming antenna, or may be swept through any suitable subset of these angles. The beam may be swept through the range of angles at any suitable granularity. The mobile device may continuously measure the RSSI of the beamforming antenna system as the angle of the beam from the base station changes. For example, a 5G base station may sweep a beam from a beamforming antenna for 5G NR FR2 across a range of angles, and the RSSI of the 5G NR FR2 antenna system and radio of the mobile device may be measured continuously. The angle at which the maximum RSSI value is measured may be the angle of the line-of-sight peak to the base station. The mobile device may receive the angle of the beam from the base station in any suitable manner. For example, as the beam is swept through the range of angles, the beam may carry its own angle as data that may be received by the mobile device. This may allow the mobile device to determine the angle of the beam from the base station when the maximum RSSI value was measured by beamforming antenna system of the mobile device. The mobile device may convert the angle received from the base station to an angle at which the signal was received at the mobile device, which may be Φpeak.

RSSI mapping may be used to determine the distance between the mobile device and the base station. The mobile device may have access to RSSI mapping data for the base station. The RSSI mapping data may correlate peak RSSIs for a broadcast signal or beamformed signal received from the base station with distances from the base station. The RSSI mapping data may have been generated in any suitable manner, including through testing of the broadcast signal from the base station. The RSSI mapping data may be, for example, a table correlating peak RSSIs with distances, or may be any suitable equations or algorithms that may allow for the conversion of a peak RSSI to a distance. The mobile device may use the RSSI mapping data to determine the distance R between the mobile device and the base station based on the peak RSSI that was measured from a broadcast or beamformed signal received by the mobile device at Φpeak. For example, the mobile device may be able to identify the 5G base station from which the broadcast or beamformed signal was received using data included in the broadcast or beamformed signal, such as, for example, a model identifier for the 5G base station. The mobile device may have access to RSSI mapping data for 5G base stations, and may obtain the RSSI mapping for the appropriate 5G base station.

The mobile device may obtain the location of the base station through a data communication link established using the beamforming antenna system or another antenna system of the mobile device. The broadcast or beamformed signal from the base station may, for example, include a base station identifier that identifies the specific base station. The mobile device may use a data communication link, for example, a WiFi link, 4G LTE link, or 5G NR FR1 or 5G NR FR2 link, and the base station identifier to obtain the location of the base station. The location of the base station may be stored in a database that may be accessible to the mobile device. The mobile device may look up the base station in the database based on the base station identifier and may receive the location of the base station from the database. The location of the base station may have been stored in the database by a party responsible for the installation of the base station. For example, a 5G base station may belong to a cellular service provider, and may have its location added to a database when the cellular service provider installs the base station. The location of the base station may be specified in any suitable manner, such as, for example, as latitude and longitude.

The location of the base station, angle of the line-of-sight peak to the base station, distance between the mobile device and the base station, and orientation of the mobile device may be used to determine the location of the mobile device. The mobile device may, for example, use Φsen, Φpeak, and R, as measured or otherwise determined at the mobile device, and the location of the base station, to calculate the location of the mobile device. The location of the mobile device may be calculated in 2-dimensions according to:

$$X_{md} = X_{ref} + R \times \cos(\Phi peak - \Phi sen)$$

$$Y_{md} = Y_{ref} + R \times \sin(\Phi peak - \Phi sen)$$

where $X_{md}$ may be the X coordinate of the location of the mobile device based on the reference frame of Φsen, $Y_{md}$ may be the Y coordinate of the location of the mobile device in the reference frame of Φsen, $X_{ref}$ may be the X coordinate of the location of the base station in the reference frame of Φsen, and $Y_{ref}$ may be the Y coordinate of the location of the base station in the reference frame of Φsen.

The mobile device may use any suitable beamforming algorithm when operating the beamforming antenna. For example, the mobile device may use conventional beamforming, Capon beamforming, Minimum Norm beamforming, or Multiple-Signal-Classification (MUSIC) beamforming. Different beamforming algorithms may result in different levels of uncertainty in the determination of Φpeak. For example, MUSIC beamforming may be higher-resolution beamforming algorithm than conventional beamforming, and may result in less uncertainty when the mobile device determines Φpeak. The beamforming may be based on a signal covariant matrix.

In some implementations, the mobile device may improve the accuracy of its determined location by finding the angle of the line-of-sight peak and the distance to multiple base stations and obtaining the locations of those base stations. The mobile device may, for example, be in an indoor environment that has multiple 5G base stations. For example, the mobile device may determine Φpeak1, which may be the angle of the line-of sight peak to a first base station, $R_1$, which may be the distance between the mobile device and the first base station based on the peak RSSI measurement that was determined from a broadcast or beamformed signal received by the mobile device at Φpeak1, Φpeak2, which may be the angle of the line-of sight peak to a second base station, and $R_2$, which may be the distance between the mobile device and the second base station based on the peak RSSI measurement that was determined from a broadcast or beamformed signal received by the mobile device at Φpeak2. The mobile device may determine Φpeakn and $R_n$ for n base stations. The angles and distances for multiple base stations may be determined as temporally close to each other as possible so that the mobile device may be in approximately the same location when the determinations are made across the multiple base stations.

An error matrix may be constructed using the angles of the line-of-sight peaks, the distances to the base stations, the orientation of the mobile device, and the locations of the base stations. The mobile device may construct the error matrix for n base stations according to:

$$ERR_{ref1}^{X} = (X_{md}^{est} - X_{ref1}) - R_{ref1} \times \cos(\Phi peak1 - \Phi sen)$$

$$ERR_{ref1}^{Y} = (Y_{md}^{est} - Y_{ref1}) - R_{ref1} \times \sin(\Phi peak1 - \Phi sen)$$

$$ERR_{ref2}^{X} = (X_{md}^{est} - X_{ref2}) - R_{ref2} \times \cos(\Phi peak2 - \Phi sen)$$

$$ERR_{ref2}^{Y} = (Y_{md}^{est} - Y_{ref2}) - R_{ref2} \times \sin(\Phi peak2 - \Phi sen)$$

...

$$ERR_{refn}^{X} = (X_{md}^{est} - X_{refn}) - R_{refn} \times \cos(\Phi peak2 - \Phi sen)$$

$$ERR_{refn}^{Y} = (Y_{md}^{est} - Y_{ref2}) - R_{refn} \times \sin(\Phi peak2 - \Phi sen)$$

where $X_{md}^{est}$ may be the X coordinate of the location of the mobile device in the reference frame of $\Phi$sen to be estimated using the error matrix, $Y_{md}^{est}$ may be the Y coordinate of the location of the mobile device in the reference frame of $\Phi$sen to be estimated using the error matrix, $X_{ref1}$ may be the X coordinate of the location of the first base station in the reference frame of $\Phi$sen, $Y_{ref1}$ may be the Y coordinate of the location of the first base station in the reference frame of $\Phi$sen, $R_{ref1}$ may be the distance from the mobile to the first base station, $\Phi$peak1 may be the angle of the line-of-sight peak from the mobile device to the first base station, $X_{ref2}$ may be the X coordinate of the location of the second base station in the reference frame of $\Phi$sen, $Y_{ref2}$ may be the Y coordinate of the location of the second base station in the reference frame of $\Phi$sen, $R_{ref2}$ may be the distance from the mobile to the second base station, $\Phi$peak2 may be the angle of the line-of-sight peak from the mobile device to the second base station, $X_{refn}$ may be the X coordinate of the location of the nth base station in the reference frame of $\Phi$sen, $Y_{refn}$ may be the Y coordinate of the location of the nth base station in the reference frame of $\Phi$sen, $R_{refn}$ may be the distance from the mobile to the nth base station and $\Phi$peakn may be the angle of the line-of-sight peak from the mobile device to the nth base station.

Weighting may be added to the errors in the error matrix based on RSSI signal uncertainties and uncertainties in the angles of the line-of-sight peaks. A weighted-least-squares (WLS) optimization may then be used to estimate the location of the mobile device, determining values for $X_{md}^{est}$ and $Y_{md}^{est}$. The mobile device may, for example, use the Nelder-Mead algorithm, modified Powell algorithm, or Newton-CG algorithm as a WLS optimization to generate the estimate of the location of the mobile device.

FIG. 1 shows an example system suitable for indoor positioning for mobile devices according to an implementation of the disclosed subject matter. A mobile device 100 may include a radio 110, a radio 120, and a storage 140. The mobile device 100 may be any suitable computing device, such as, for example, a computer 20 as described in FIG. 12 that may include the radio 110, the radio 120, the locator 130, the storage 140, and one or both of the IMU 150, the camera 160. The mobile device 100 may be, for example, a single computing device, or may include multiple connected computing devices, and may be, for example, a smartphone, tablet, laptop, smart watch, or other mobile computing device. The radio 110 may be, for example, a wireless radio that employs a beamforming antenna system 112 to establish wireless links. For example, the radio 110 may be a 5G NR radio. The radio 110 may also include an antenna system 116, which may be non-beamforming. The radio 120 may be, for example, a wireless radio that employs an antenna system 122 that may be non-beamforming to establish wireless links. For example, the radio 120 may be a 4G LTE radio or a Wi-Fi radio. The locator 130 may be any suitable combination of hardware and software for determining the location of the mobile device 100. For example, the locator 130 may be a hardware component of the mobile device 100, or may be a software component running on a processor of the mobile device 100. The IMU 150 may be any suitable combination of hardware and software on the mobile device for implementing an IMU, and may include, for example, an accelerometer, gyroscope, and/or magnetometer. The camera 160 may be any suitable hardware and software for implementing a camera on the mobile device. The storage 140 may be any suitable combination of hardware and software for implementing any combination of volatile and non-volatile storage, and may include storage that may be accessed by the radio 110, the radio 120, the locator 130, the IMU 150, and the camera 160.

The radio 110 may include the beamforming antenna system 112, which may include a beamforming antenna 115. The beamforming antenna 115 may be any suitable antenna which may allow for beamforming. For example, the beamforming antenna 115 may be phased array antenna including any number of individual antenna elements. The beamforming antenna system 112, as part of the radio 110, may control the beamforming antenna 115, generating beams to establish wireless links with other devices that include the appropriate radios and antennas. Beamforming may be used in both transmitting and receiving modes of the beamforming antenna system 112. For example, in transmitting mode, beamforming may be used to form a transmitted beam of energy by controlling transmitted energy from individual antenna elements of a phased antenna array. In receiving mode, beamforming may be used to control the weighting given to the signal received by different antenna elements of the phased antenna array. The beam in the receiving mode may be the direction in which the phased array antenna is most sensitive to receiving signals based on the weightings. The beamforming antenna system 112 may operate the beamforming antenna 115 at any suitable frequency range. For example, the radio 110 may be a 5G NR radio, and the beamforming antenna system 112 may be used for 5G NR FR2, which may operate from 24 GHz into millimeter wave frequencies. In some implementations, the radio 110 may include an antenna system 116, with a non-beamforming antenna 119, in addition to the beamforming antenna system 112. The antenna system 116 may be part of the radio 110 that operates the antenna 119 at a frequency range different from that of the beamforming antenna system 112. For example, the antenna system 116 may be used by a 5G NR radio for 5G NR FR1, which may include sub-6 GHz frequency bands. The radio 110 may use the beamforming antenna system 112 and the antenna system 116 concurrently, as each antenna system may communicate over separate wireless links The radio 120 may include the antenna system 122, which may include the antenna 125. The antenna 125 may be non-beamforming antenna, and may be operated by the antenna system 122 at any suitable frequencies. For example, the radio 120 may be a 4G LTE radio, and the antenna system 122 may operate at 700 MHz, 1700-2100 MHz, 2500-2700 MHz, or any other 4G LTE frequency band. The radio 120 may be, for example, a Wi-Fi radio, and the antenna system may operate at 900 MHz 2.4 GHz, 3.6 GHz, 4.9 GHz, 5 GHz, 5.9 GHz and 60 GHz, or any other Wi-Fi frequency band. The radio 110 and the radio 120, and their antenna systems, may operate concurrently in the mobile device 100, communicating over separate wireless links.

The locator 130 may be any suitable combination of hardware and software components of the mobile device 100. For example, the locator 130 may be a hardware component of the mobile device 100, or may be a software component running on a processor of the mobile device 100. The locator 130 may determine the location of the mobile device 100 using data from other components of the mobile device 100, such as, for example, orientation data from the IMU 150 and/or images from the camera 160, and angle and RSSI data from the radio 110 and beamforming antenna system 112, and base station locations.

The IMU 150 may be any suitable combination of hardware and software on the mobile device for implementing an IMU, and may include, for example, an accelerometer, gyroscope, and/or magnetometer. The IMU may be a hardware component that may include, and may collect data on the orientation of the mobile device 100 from, an accelerometer, gyroscope, and/or magnetometer. The IMU may use orientation data to determine the orientation of the mobile device 100, or may send the orientation data 130 to the locator 130 to be used to determine the orientation of the mobile device.

The camera 160 may be any suitable hardware and software for implementing a camera on the mobile device. The camera 160 may include any number of cameras, which may be located at any suitable locations on the mobile device 100. For example, a smartphone may include both a front-facing camera and a rear camera. The camera 160 may be used to capture images of the environment of the mobile device 100. Images captured by the camera 160 may be used to determine the orientation of the mobile device. For example, visual odometry (and/or another technique) may be applied to images captured by the camera 160 to determine the orientation of the mobile device. Visual odometry may be applied by a component of the camera 160, or by another component of the mobile device 100 such as, for example, the locator 130.

The storage 140 may be any suitable storage hardware connected to the mobile device 100. For example, the storage 140 may be a component of the computing device, and may include both volatile and non-volatile storage components. The storage 140 may store data that may be used by locator 130 to determine the location of the mobile device 100, such as angle and RSSI data from the radio 110 and beamforming antenna system 115, orientation data from the IMU 150, and images from the camera 160.

Figure 2A:
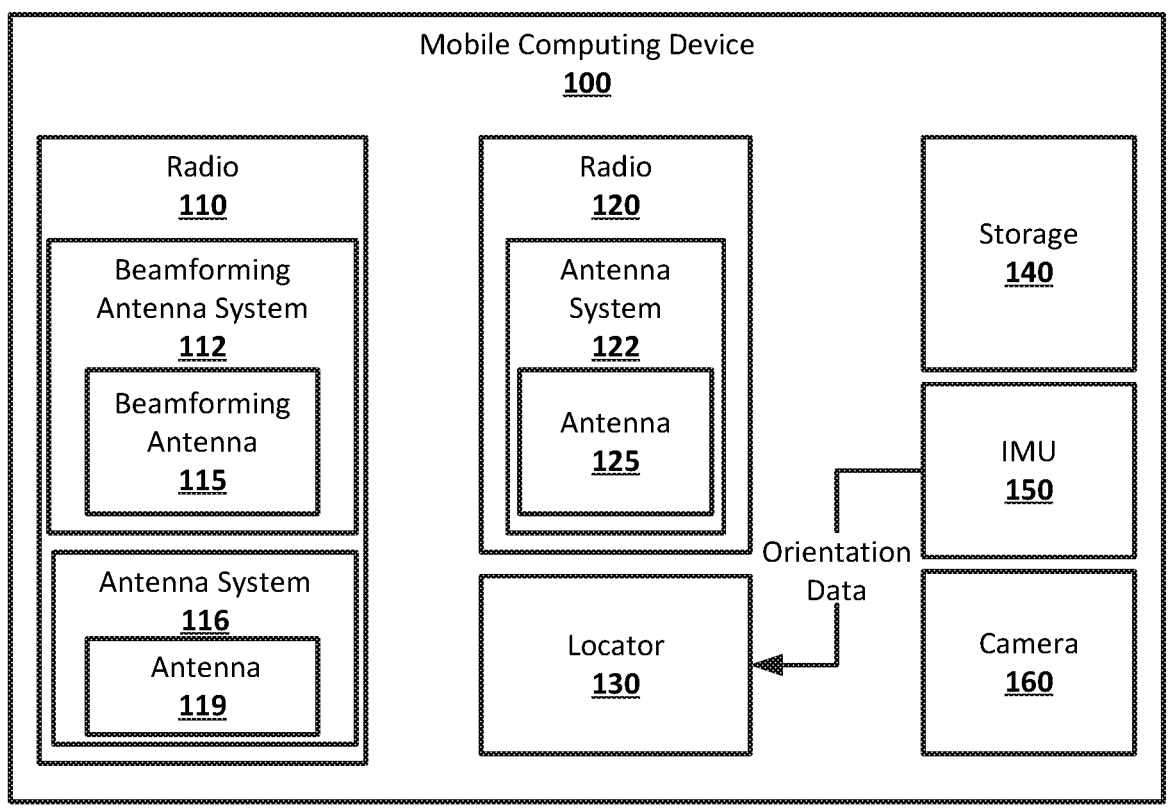
FIG. 2A shows an example arrangement suitable for indoor positioning for mobile devices according to an implementation of the disclosed subject matter.

FIG. 2A shows an example arrangement suitable for indoor positioning for mobile devices according to an implementation of the disclosed subject matter. The IMU 150 of the mobile device 100 may provide orientation data to the locator 130. The IMU 150 may include sensors that may provide data that may be used to determine the orientation of the mobile device 100. Data may be collected from an accelerometer, gyroscope, and/or magnetometer of the IMU 150 and provided to the locator 130 as orientation data. Data provided by the IMU 150 may be used by the locator 130 to determine the orientation of the mobile device 100, and the orientation of the beamforming antenna 115 and its radio 110, as the angle $\Phi$sen. The IMU 150 may also determine the orientation of the mobile device 100 using the data from the sensors and provide angle $\Phi$sen as orientation data to the locator 130. The determined orientation may be determined in any suitable reference frame. For example, the orientation of the mobile computing device 100 may be expressed as an angle $\Phi$sen relative to a reference frame based on the latitude and longitude lines of the earth, with the X-axis of the reference frame running parallel to the lines of latitude and Y-axis running parallel to the lines of longitude, and an origin at the center of the beamforming antenna 115 of the mobile computing device 100.

Figure 2B:
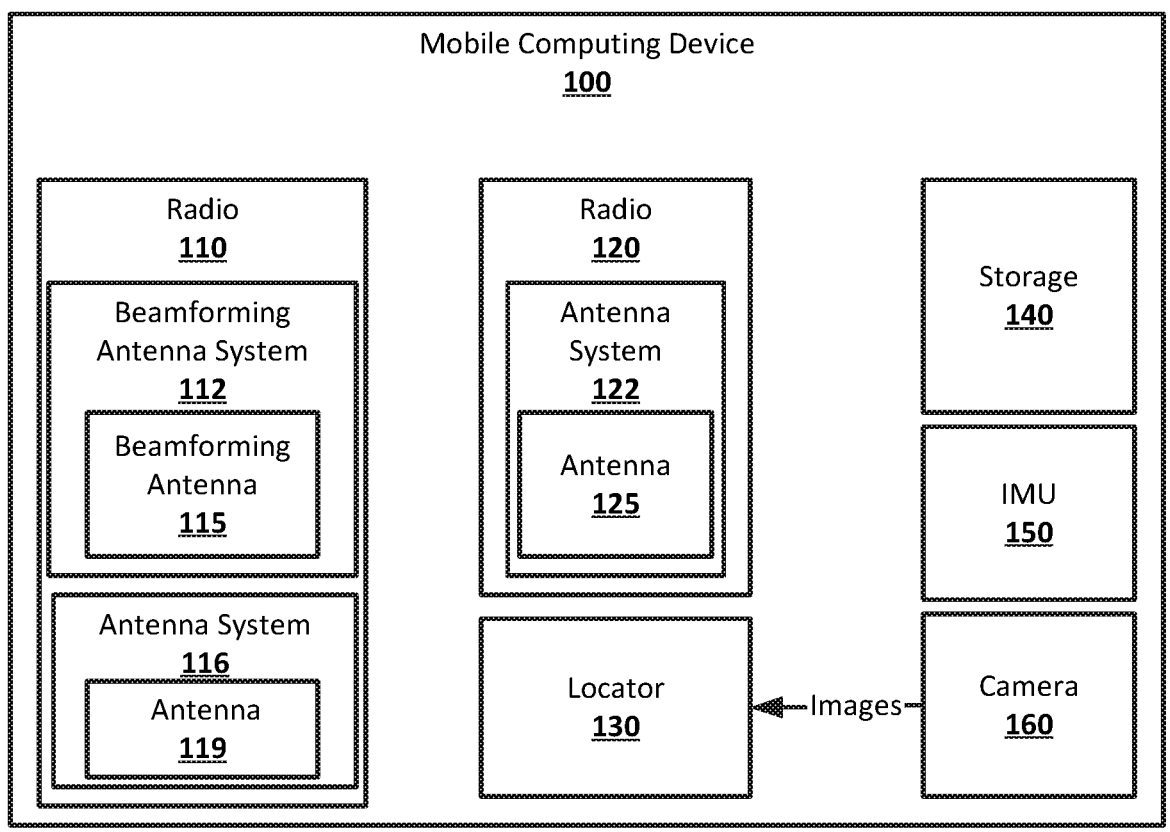
FIG. 2B shows an example arrangement suitable for indoor positioning for mobile devices according to an implementation of the disclosed subject matter.

FIG. 2B shows an example arrangement suitable for indoor positioning for mobile devices according to an implementation of the disclosed subject matter. The camera 160 of the mobile device 100 may provide images to the locator 130. The images may be of the environment around the mobile device 100. The locator 130 may use visual odometry on the images form the camera 160 to determine the orientation of the mobile device 100. For example, an image from the camera 160 may be analyzed for features, such as the presence of a floor, walls, and a ceiling. The location and orientation of these features in the image, and the location of the camera 160, which captured the image, on the mobile device 100, may be used to determine the orientation of the mobile device 100, and determine the orientation of the beamforming antenna 115 and its radio 110, as the angle $\Phi$sen. The camera 160 may also determine the orientation of the mobile device 100 using the images and provide the orientation to the locator 130 as the angle $\Phi$sen. The determined orientation may be determined in any suitable reference frame. For example, the orientation of the mobile computing device 100 may be expressed as an angle $\Phi$sen relative to a reference frame based on the latitude and longitude lines of the earth, with the X-axis of the reference frame running parallel to the lines of latitude and Y-axis running parallel to the lines of longitude, and an origin at the center of the beamforming antenna 115 of the mobile computing device 100.

Figure 3A:
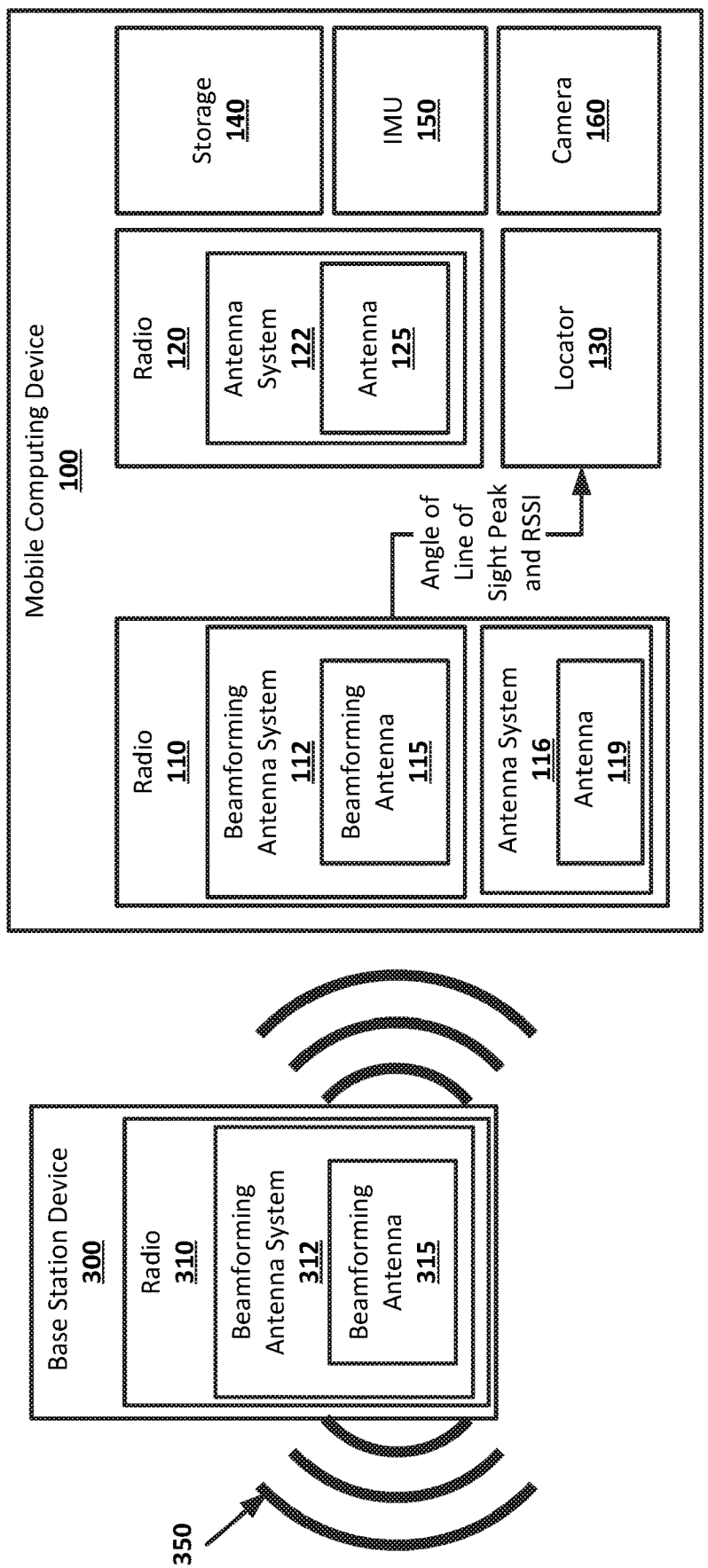
FIG. 3A shows an example arrangement suitable for indoor positioning for mobile devices according to an implementation of the disclosed subject matter.

FIG. 3A shows an example arrangement suitable for indoor positioning for mobile devices according to an implementation of the disclosed subject matter. The angle of the line-of-sight peak from the mobile computing device 100 to a base station device 300 may be determined. The base station device 300 may be any suitable base station for wireless communications, and may be, for example, a 5G base station. The base station device 300 may include a radio 310 with a beamforming antenna system 312 and a beamforming antenna 314. The radio 310, beamforming antenna system 312, and beamforming antenna 314 may be used for sending and receiving signals, for example, for 5G NR FR2. The beamforming antenna 314 may operate in transmitting mode and may broadcast a signal 350. The beamforming antenna 115 may be operated in a receiving mode and may be scanned through a range of angles. The beamforming antenna 115 may be scanned through the range of angles at any suitable granularity. At each separate angle the RSSI of the beamforming antenna system 112 may be measured based on the strength of the signal 350 as received at the beamforming antenna 115. After completing a scan through the range of angles, the angle at which the measured RSSI was at a peak may be determined. This may be the angle $\Phi$peak of the line of the sight peak from the mobile computing device 100 to the base station device 300. The angle $\Phi$peak of the line-of-sight peak may be sent to the locator 130 with the RSSI that was measured at the angle $\Phi$peak. The angle $\Phi$peak may be determined in the reference frame used by the beamforming antenna system 112, which may, for example, have its origin at the center of the beamforming antenna 115, an X-axis parallel to the width of the mobile computing device 100, and a Y-axis parallel to the length of the mobile computing device 100.

FIG. 3B shows an example arrangement suitable for indoor positioning for mobile devices according to an implementation of the disclosed subject matter. The angle of the line-of-sight peak from the mobile computing device 100 to a base station device 300 may be determined. The beamforming antenna 314 may operate in transmitting mode and may generate a beam 360. The beam 360 may be swept through a range of angles. The beam 360 may be swept through angles at any suitable granularity. The beamforming antenna 115 may be operated in a receiving mode. The RSSI of the beamforming antenna system 112 may be measured based on the strength of the beam 360 at the beamforming antenna 115 as the beam 360 is swept through the range of angles. The beam 360 may also transmit data indicating its current angle. After the beam 360 has been swept through the range of the angles, the angle at which the measured RSSI was at a peak may be determined. This may be the angle Φpeak of the line of the sight peak from the mobile computing device 100 to the base station device 300. The angle Φpeak of the line-of-sight peak may be sent to the locator 130 with the RSSI that was measured at the angle Φpeak. The angle Φpeak may be determined in the reference frame used by the beamforming antenna system 112, which may, for example, have its origin at the center of the beamforming antenna 115, an X-axis parallel to the width of the mobile computing device 100, and a Y-axis parallel to the length of the mobile computing device 100.

Figure 4:
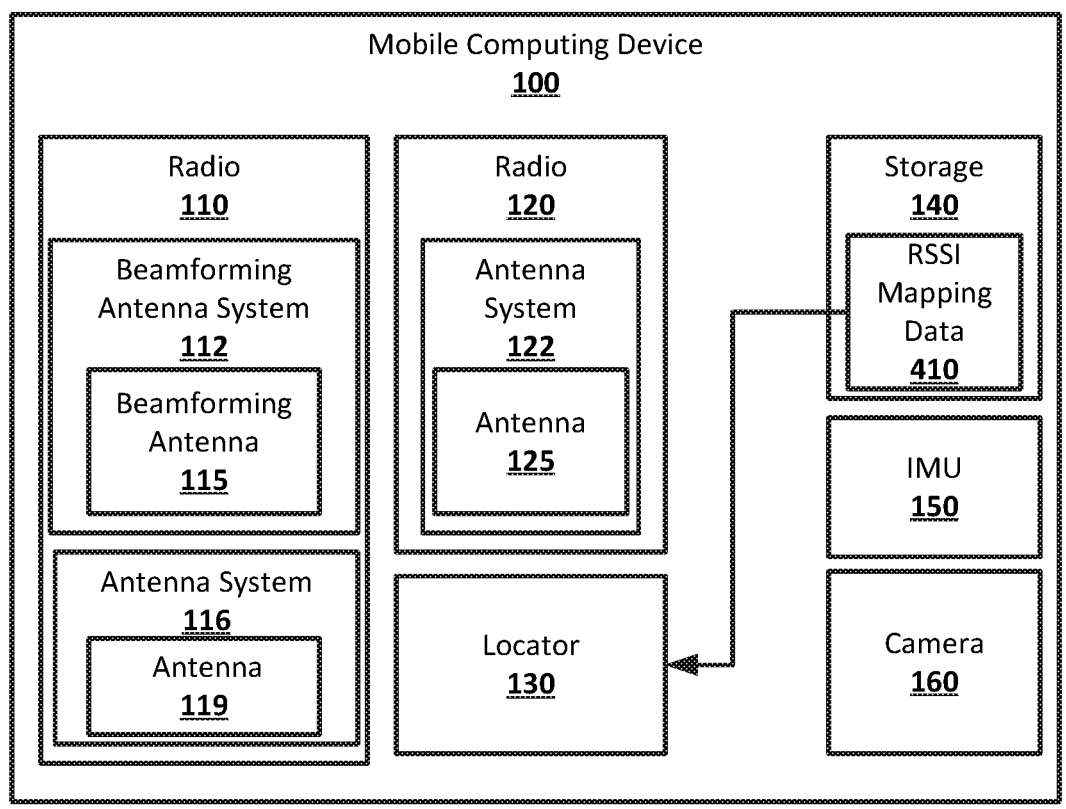
FIG. 4 shows an example arrangement suitable for indoor positioning for mobile devices according to an implementation of the disclosed subject matter.

FIG. 4 shows an example arrangement suitable for indoor positioning for mobile devices according to an implementation of the disclosed subject matter. The mobile computing device 100 may use RSSI mapping may to determine the distance between the mobile computing device 100 and the base station device 300. The locator 130 may, for example, access RSSI mapping data 410, which may include RSSI mapping data 410 for the base station device 300, from the storage 140. The RSSI mapping data 410 may correlate peak RSSIs for a broadcast signal or beamformed signal received from the base station device 300 with distances from the base station device 300. The RSSI mapping data 410 may have been generated in any suitable manner, including through testing of the broadcast signal from the base station device 300. The RSSI mapping data 410 may be, for example, a table correlating peak RSSIs with distances, or may be any suitable equations or algorithms that may allow for the conversion of a peak RSSI to a distance. The locator 130 may use the RSSI mapping data 410 to determine the distance R between the mobile computing device 100 and the base station device 300 based on the RSSI at Φpeak, as received by the locator 130 from the beamforming antenna system 112.

Figure 5:
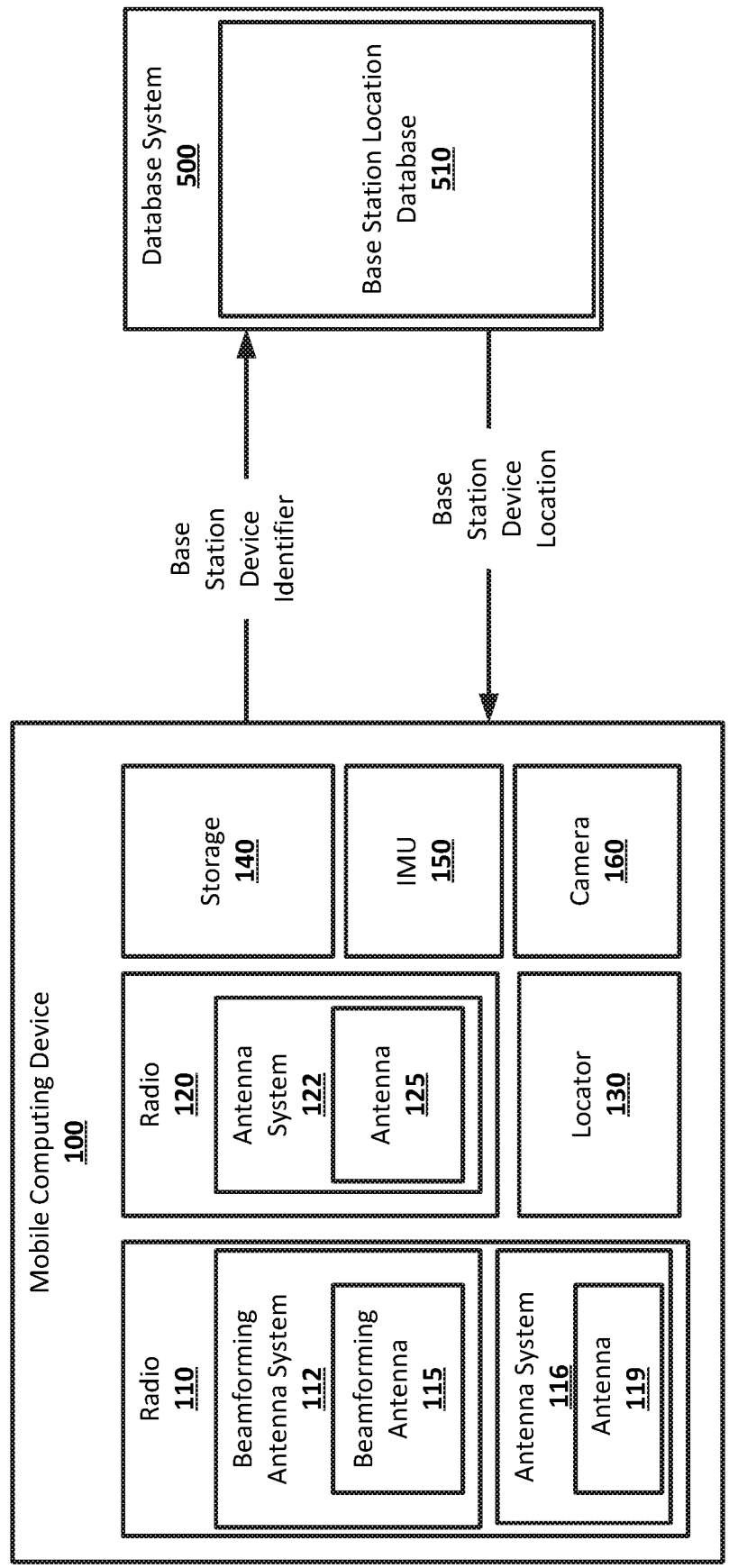
FIG. 5 shows an example arrangement suitable for indoor positioning for mobile devices according to an implementation of the disclosed subject matter.

FIG. 5 shows an example arrangement suitable for indoor positioning for mobile devices according to an implementation of the disclosed subject matter. The locator 130 may obtain the location of the base station device 300. The mobile computing device 100 may send a base station identifier to a database system 500 through a data communication link established using the beamforming antenna system 112, the antenna system 116, or the antenna system 122. The broadcast signal 350 or beam 360 from the base station device 300 may, for example, include a base station device identifier, which may be data identifying the specific base station device 300. The data communications link may be, for example, a WiFi link, 4G LTE link, or 5G NR FR1 or 5G NR FR2 link. The database system 500 may be any suitable database system, including any suitable computing devices. The database system 500 may include a base station location database 510. The base station location database 510 may correlate specific base station devices, for example, identified by base station device identifiers, with their locations, for example, specified in latitude and longitude. The base station device identifier sent from the mobile computing device 100 may be looked up in the base station location database 510, and the base station device location for the base station device 300 may be sent to the mobile computing device 100 over the data communications link. The locator 130 may receive the base station device location for the base station device 300.

Figure 6:
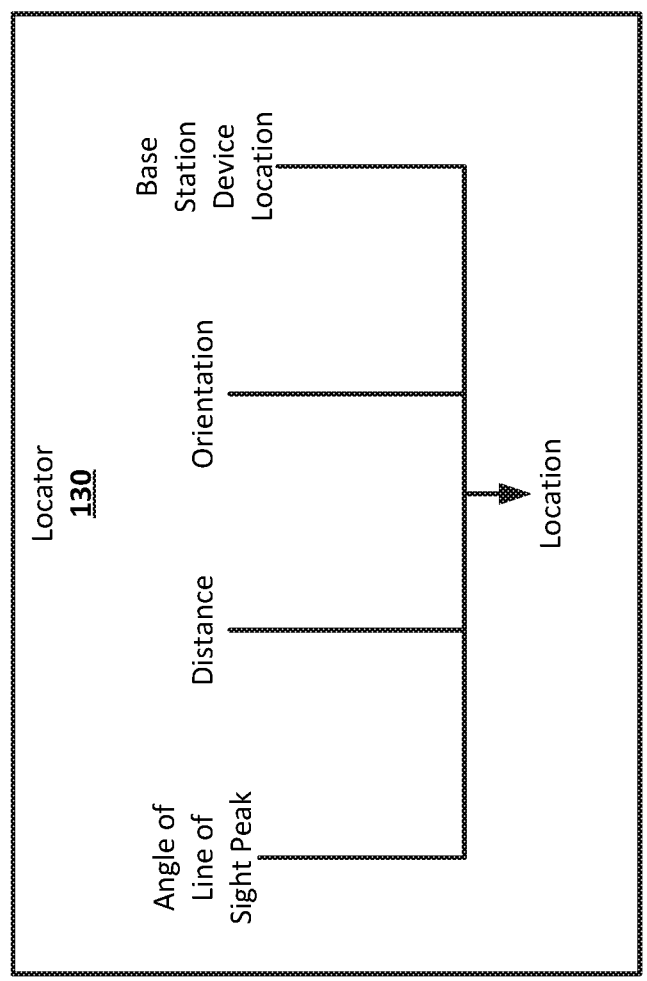
FIG. 6 shows an example arrangement suitable for indoor positioning for mobile devices according to an implementation of the disclosed subject matter.

FIG. 6 shows an example arrangement suitable for indoor positioning for mobile devices according to an implementation of the disclosed subject matter. The locator 130 of the mobile computing device 100 may use the location of the base station device 300, angle of the line-of-sight peak to the base station device 300, distance between the mobile computing device 100 and the base station device 300, and orientation of the mobile computing device 100 to determine the location of the mobile computing device 100. The mobile computing device 100 may, for example, use Φsen, as determined from data from the IMU 150 and/or the camera 160, Φpeak, as determined using the beamforming antenna system 112, R, as determined using the RSSI that corresponds to Φpeak and the RSSI mapping data 410, and the location of the base station device 100, as determine using the base station location database 510, to calculate the location of the mobile computing device 100. The location of the mobile computing device 100 may be calculated in 2-dimensions according to:

$$X_{md}=X_{ref}+R\times\cos(\Phi\text{peak}-\Phi\text{sen})$$

$$Y_{md}=Y_{ref}+R\times\sin(\Phi\text{peak}-\Phi\text{sen})$$

where $X_{md}$ may be the X coordinate of the location of the mobile computing device 100 in the reference frame of Φsen, $Y_{md}$ may be the Y coordinate of the location of the mobile computing device 100 in the reference frame of Φsen, $X_{ref}$ may be the X coordinate of the location of the base station device 300 in the reference frame of Φsen, and $Y_{ref}$ may be the Y coordinate of the location of the base station device 300 in the reference frame of Φsen.

The location determined by the locator 130 may be specified in any suitable manner, including, for example, a latitude and longitude. The way in which the location is specified may be based on the reference frame used in determining the location. The location of the mobile computing device 100 determined by the locator 130 may be used in any suitable manner by the mobile computing device 100.

Figure 7:
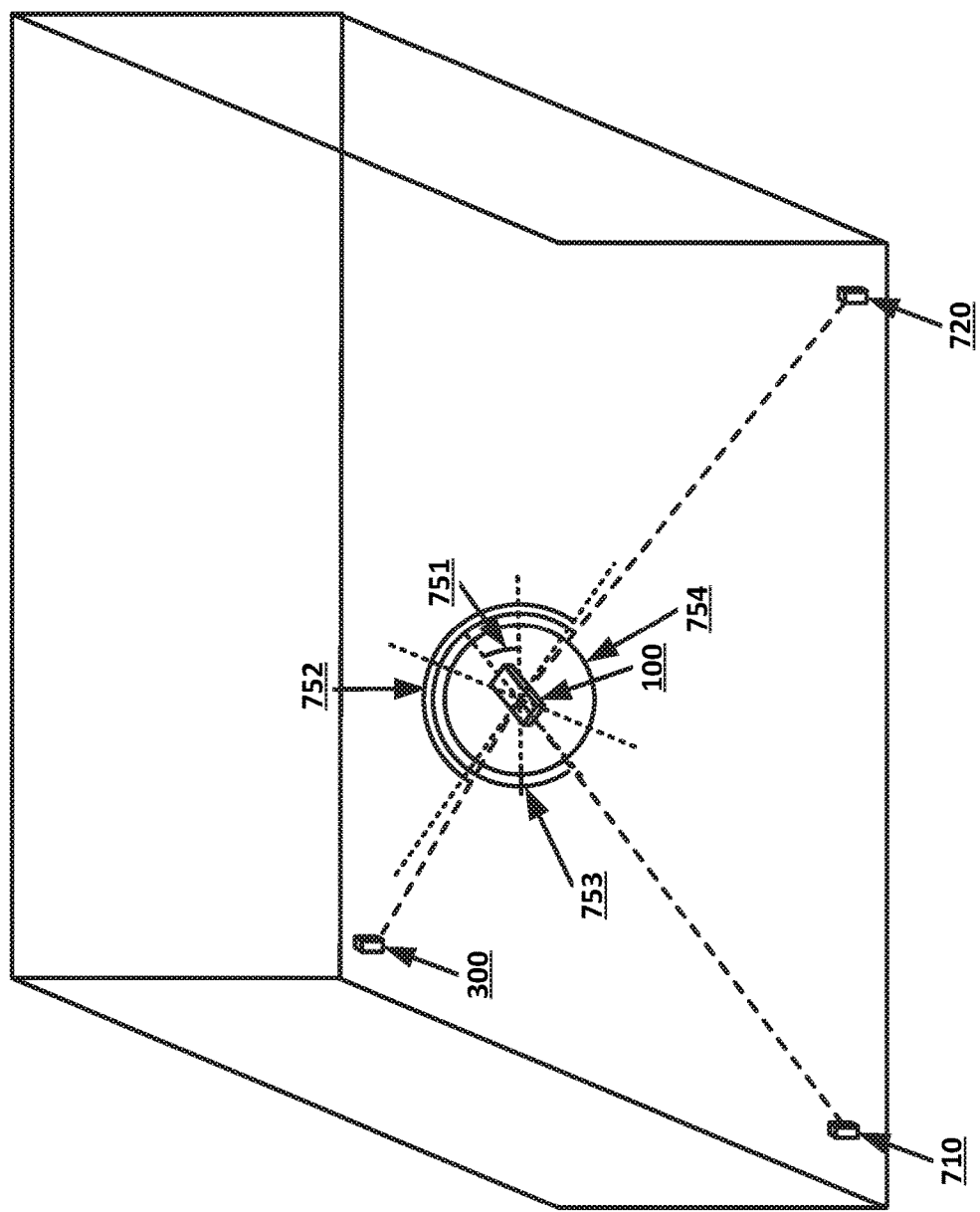
FIG. 7 shows an example arrangement suitable for indoor positioning for mobile devices according to an implementation of the disclosed subject matter.

FIG. 7 shows an example arrangement suitable for indoor positioning for mobile devices according to an implementation of the disclosed subject matter. In some implementations, the mobile computing device 100 may improve the accuracy of its determined location by finding the angle of the line-of-sight peak and the distance to, and location of, multiple base station devices, such as the base station device 300, base station device 710, and base station device 720. The base station device 710 and the base station device 720 may be, for example, 5G base stations located in the same room as the base station device 300. The mobile computing device 100 may, using the IMU 150 and/or the camera 160, determine Φsen, which be an angle 751 determined in a reference frame between an X-axis of the reference frame and an orientation the beamforming antenna 115 of the mobile computing device 100, for example, based on the direction of the length of the mobile computing device 100. The mobile computing device 100 may determine Φpeak1, which may be an angle 752 of the line-of sight peak to the base station device 300 determined based on an angle used by the beamforming antenna 115 when a peak RSSI is measured at the beamforming antenna system 112 for a signal received from the base station device 300 when the beamforming antenna 115 is in a receiving mode and scanned through a range of angles, or when a beam from the base station device 300 is swept through a range of angles. The reference frame for Φpeak1 may be based on the beamforming antenna 115, and may be different than the reference frame used for Φsen. A distance $R_1$, which may be the distance between the mobile computing device 100 and the base station device 300, may be determined, for example, by the locator 130 based on the peak RSSI measurement that was determined from a broadcast or beamformed signal received by the mobile computing device 100 at Φpeak1. The mobile computing device 100 may determine Φpeak2, which may be an angle 753 of the line-of sight peak to the base station device 710 determined based on an angle used by the beamforming antenna 115 when a peak RSSI is measured at the beamforming antenna system 112 for a signal received from the base station device 710 when the beamforming antenna 115 is in a receiving mode and scanned through a range of angles, or when a beam from the base station device 710 is swept through a range of angles. The reference frame for Φpeak2 may be based on the beamforming antenna 115, and may be different than the reference frame used for Φsen A distance $R_2$, which may be the distance between the mobile computing device 100 and the base station device 710, may be determined, for example, by the locator 130 based on the peak RSSI measurement that was determined from a broadcast or beamformed signal received by the mobile computing device 100 at Φpeak2. The mobile computing device 100 may determine Φpeak3, which may be an angle 754 of the line-of sight peak to the base station device 720 determined based on an angle used by the beamforming antenna 115 when a peak RSSI is measured at the beamforming antenna system 112 for a signal received from the base station device 720 when the beamforming antenna 115 is in a receiving mode and scanned through a range of angles, or when a beam from the base station device 710 is swept through a range of angles. The reference frame for Φpeak3 may be based on the beamforming antenna 115, and may be different than the reference frame used for Φsen A distance $R_3$, which may be the distance between the mobile computing device 100 and the base station device 730, may be determined, for example, by the locator 130 based on the peak RSSI measurement that was determined from a broadcast or beamformed signal received by the mobile computing device 100 at Φpeak3. The mobile computing device 100 may determine Φpeakn and $R_n$ for n base stations. The angles and distances for multiple base stations may be determined as temporally close to each other as possible so that the mobile device may be in approximately the same position when the determinations are made across the multiple base stations.

The locator 130 of the mobile computing device 100 may construct an error matrix using the angles of the line-of-sight peaks to the base station devices 300, 710, and 720, the distances to the base station devices 300, 710, and 720, the orientation of the mobile computing device 100, and the locations of the base station devices 300, 710, and 720. The locator 130 of the mobile computing device 100 may construct the error matrix for n base stations according to:

$$ERR_{ref1}^X = (X_{md}^{est} - X_{ref1}) - R_{ref1} \times \cos(\Phi peak1 - \Phi sen)$$

$$ERR_{ref1}^Y = (Y_{md}^{est} - Y_{ref1}) - R_{ref1} \times \sin(\Phi peak1 - \Phi sen)$$

$$ERR_{ref2}^X = (X_{md}^{est} - X_{ref2}) - R_{ref2} \times \cos(\Phi peak2 - \Phi sen)$$

$$ERR_{ref2}^Y = (Y_{md}^{est} - Y_{ref2}) - R_{ref2} \times \sin(\Phi peak2 - \Phi sen)$$

. . .

$$ERR_{refn}^X = (X_{md}^{est} - X_{refn}) - R_{refn} \times \cos(\Phi peak2 - \Phi sen)$$

$$ERR_{refn}^Y = (Y_{md}^{est} - Y_{ref2}) - R_{refn} \times \sin(\Phi peak2 - \Phi sen)$$

where $X_{md}^{est}$ may be the X coordinate of the location of the mobile computing device 100 in the reference frame of Φsen to be estimated using the error matrix, $Y_{md}^{est}$ may be the Y coordinate of the location of the mobile computing device 100 in the reference frame of Φsen to be estimated using the error matrix, $X_{ref1}$ may be the X coordinate of the location of the base station device 300 in the reference frame of Φsen, $Y_{ref1}$ may be the Y coordinate of the location of the base station device 300 in the reference frame of Φsen, $R_{ref1}$ may be the distance from the mobile to the base station device 300, Φpeak1 may be the angle of the line-of-sight peak from the mobile computing device 100 to the base station device 300, $X_{ref2}$ may be the X coordinate of the location of the base station device 710 in the reference frame of Φsen, $Y_{ref2}$ may be the Y coordinate of the location of the base station device 710 in the reference frame of Φsen, $R_{ref2}$ may be the distance from the mobile to the base station device 710, Φpeak2 may be the angle of the line-of-sight peak from the mobile computing device 100 to the base station device 710, $X_{refn}$ may be the X coordinate of the location of the nth base station in the reference frame of Φsen, $Y_{refn}$ may be the Y coordinate of the location of the nth base station in the reference frame of Φsen, $R_{refn}$ may be the distance from the mobile to the nth base station and Φpeakn may be the angle of the line-of-sight peak from the mobile computing device 100 to the nth base station.

The locator 130 may add weighting to the errors in the error matrix based on RSSI signal uncertainties and uncertainties in the angles of the line-of-sight peaks. The locator 130 may calculate the location of the mobile computing device 100 using a weighted-least-squares (WLS) optimization to estimate the location of the mobile computing device 100, determining values for $X_{md}^{est}$ and $Y_{md}^{est}$. The locator 130 may, for example, use the Nelder-Mead algorithm, modified Powell algorithm, or Newton-CG algorithm as a WLS optimization to generate the estimate of the location of the mobile computing device 100.

Figure 8:
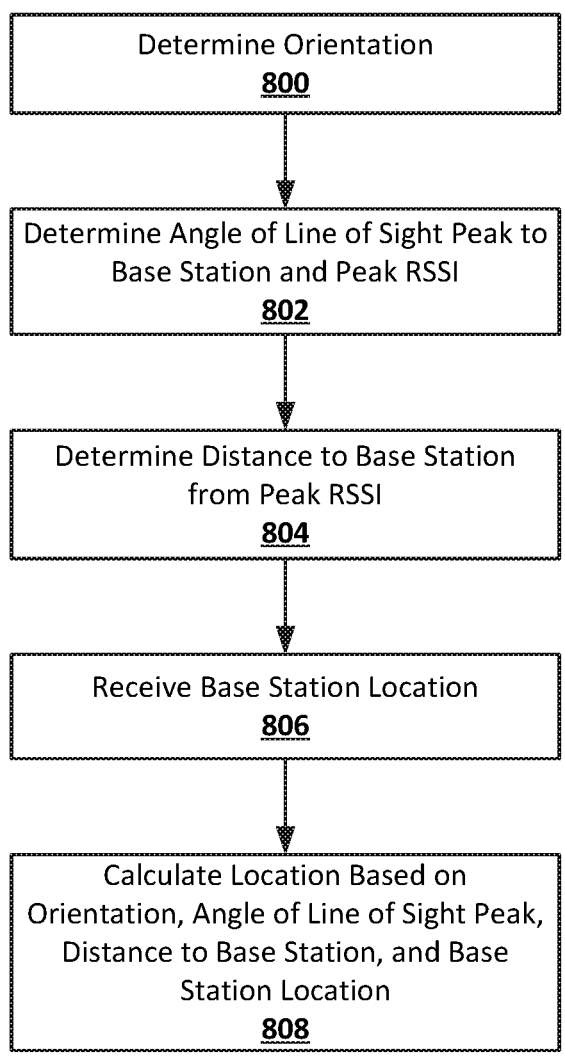
FIG. 8 shows an example of a process suitable for indoor positioning for mobile devices according to an implementation of the disclosed subject matter.

FIG. 8 shows an example of a process suitable for indoor positioning for mobile devices according to an implementation of the disclosed subject matter. At 800, an orientation may be determined. For example, the locator 130 of the mobile computing device 100 may receive orientation data from the IMU 150 and/or the camera 160. The orientation data may include, for example, readings from sensors such as accelerometers, gyroscopes, and magnetometers, and images from a camera or orientation angles determined from the images through visual odometry. The locator 130 may use the orientation data to determine an angle Φsen, which may be the angle at which the beamforming antenna 115 is oriented relative to a reference frame such as, for example, a reference frame based on the latitude and longitude lines of the earth, with the X-axis of the reference frame running parallel to the lines of latitude and Y-axis running parallel to the lines of longitude, and an origin at the center of the beamforming antenna 115 of the mobile computing device 100.

At 802, an angle of the line-of-sight peak to a base station and a peak RSSI may be determined. For example, the beamforming antenna 115 of the mobile computing device 100 may be operated in a receiving mode to determine an angle Φpeak of the line-of-sight peak which has a peak RSSI for a signal received from the base station device 300 as measured at the beamforming antenna system 112. The signal from the base station device 300 may be, for example, a broadcast signal 350, and the beamforming antenna 115 may be scanned through a range of angles, or the signal may be, for example, a beam 360, and the beamforming antenna 315 may sweep the beam through a range of angles with the beam 360 transmitting data that includes the current angle of the beam 360.

At 804, a distance to the base station may be determined from the peak RSSI. For example, the locator 130 of the mobile computing device 100 may use RSSI mapping data 410, which may be stored in the storage 140 or may be received from another computing device, to determine the distance R between the mobile computing device 100 and the base station device 300 using the peak RSSI that was measured at the angle Φpeak of the line-of-sight peak.

At 806, a base station location may be received. For example, the locator 130 may receive the location of the base station device 300 from the database system 500, which may include the base station location database 510. The location of the base station device 300 may be specified in any suitable manner, including, for example, as a latitude and longitude.

At 808, a location may be calculated based on the orientation, angle of the line-of-sight peak, distance to the base station, and base station location. For example, the locator 130 may calculate the location of the mobile computing device 100 using the orientation determined for the beamforming antenna 115, angle Φpeak of the line-of-sight peak to the base station device 300, distance to the base station device 300, and location of the base station device 300. The location may be calculated according to:

$$X_{md} = X_{ref} + R \times \cos(\Phi peak - \Phi sen)$$

$$Y_{md} = Y_{ref} + R \times \sin(\Phi peak - \Phi sen)$$

where $X_{md}$ may be the X coordinate of the location of the mobile computing device 100 in the reference frame of Φsen, $Y_{md}$ may be the Y coordinate of the location of the mobile computing device 100 in the reference frame of Φsen, $X_{ref}$ may be the X coordinate of the location of the base station device 300 in the reference frame of Φsen, and $Y_{ref}$ may be the Y coordinate of the location of the base station device 300 in the reference frame of Φsen.

Figure 9:
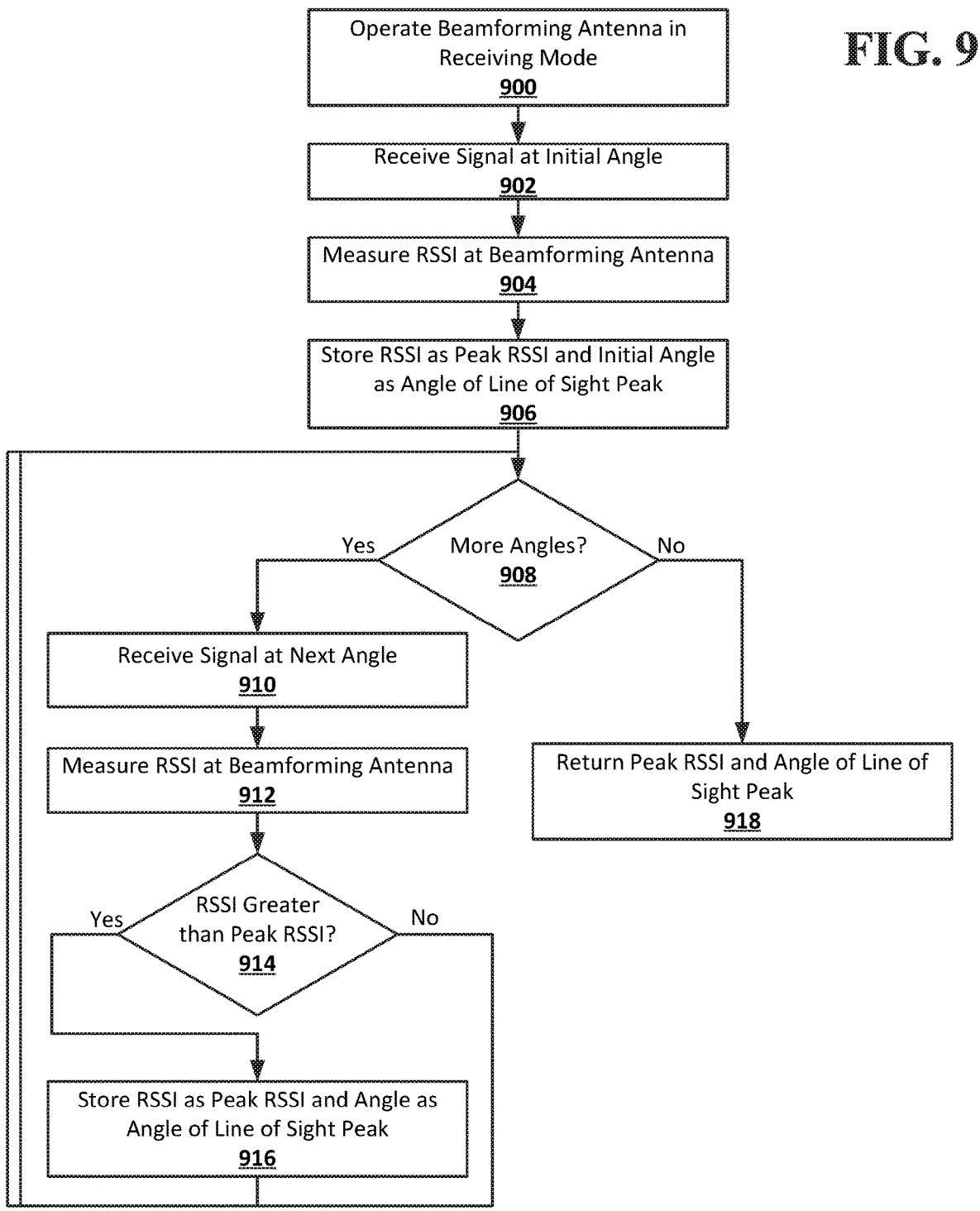
FIG. 9 shows an example of a process suitable for indoor positioning for mobile devices according to an implementation of the disclosed subject matter.

FIG. 9 shows an example of a process suitable for indoor positioning for mobile devices according to an implementation of the disclosed subject matter. At 900, a beamforming antenna may be operated in a receiving mode. For example, the beamforming antenna system 112 of the mobile computing device 100 may operate the beamforming antenna 115 in a receiving mode. The beamforming antenna system 112 may be, for example, an antenna system for 5G NR FR2 for the radio 110, which may be a 5G NR radio.

At 902, a signal may be received at initial angle. For example, the beamforming antenna 115 may receive a signal from the base station device 300 at an initial angle. The signal may be a broadcast signal from the base station device 300, and the initial angle may be a receiving angle of the beamforming antenna 115, or the signal may be a beam generated by the base station device 300 and carrying as data the angle at which the beam is generated, and the initial angle may be an angle based on the angle at which the beam is generated. The signal from the base station device 300 may be a 5G NR FR2 signal.

At 904, RSSI of the beamforming antenna may be measured. For example, the RSSI at the beamforming antenna system 112 based on the signal received from the base station device 300 may be measured while the signal is being received at the initial angle. The RSSI may be measured in any suitable manner using any suitable component that may be part of the mobile computing device 100. For example, the RSSI for the antenna system 112 may be measured by components of the radio 110. The RSSI may be, for example, for a 5G NR FR2 signal received at the beamforming antenna 115 from the base station device 300.

At 906, the RSSI may be stored as a peak RSSI and the initial angle may be stored as an angle of the line-of-sight peak. For example, the initial angle of the signal received at the beamforming antenna 115 and the RSSI measured for the signal at that angle may be stored as a peak RSSI and angle of the line-of-sight peak to the base station device 300 in any suitable storage, such as, for example, in volatile or non-volatile components of the storage 140.

At 908, if there are more angles for the beamforming antenna to receive at or for the beam to be swept through, flow may proceed to 910. Otherwise, flow may proceed to 918. For example, if the signal from the base station device 300 is a broadcast signal, the beamforming antenna 115 may be scanned through a range of angles in a receiving mode. If the beamforming antenna 115 has not yet been scanned through the entire range of angles, the beamforming antenna 115 may be operated to receive at a next angle from the current angle. The range of angles may be, for example, all angles through which the beamforming antenna system 112 is capable of scanning the beamforming antenna 115, or some specified subset of those angles. The beamforming antenna 115 may be scanned through the range of angles at any suitable granularity. If the signal from the base station device 300 is a beam, the beam may be swept through a range of angles in a transmitting mode. If the beam has not been swept through the entire, the beam may be generated at a next angle from the current angle. The range of angles may be, for example, all angles at which the base station device 300 is capable of generating the beam, or some specified subset of those angles. The beam may be swept through the range of angles at any suitable granularity.

At 910, the signal may be received at the next angle. For example, if the signal is ab broadcast signal, the beamforming antenna system 112 of the mobile computing device 100 may operate the beamforming antenna 115 to receive at the next angle in the range of angles that beamforming antenna 115 is being scanned through. The next angle may be any suitable distance from the previous angle, for example, based on the granularity of the beamforming capabilities of the beamforming antenna system 112. If the signal is a beam, the base station device 300 may generate the beam at the next angle in the range of angles that the beam is being swept through. The next angle may be any suitable distance from the previous angle, for example, based on the granularity of the beamforming capabilities of the base station device 300.

At 912, RSSI of the beamforming antenna may be measured. For example, the RSSI at the beamforming antenna system 112 based on the signal received from the base station device 300 may be measured while the signal is being received at a current angle. The RSSI may be measured in any suitable manner using any suitable component that may be part of the mobile computing device 100. For example, the RSSI for the antenna system 112 may be measured by components of the radio 110. The RSSI may be, for example, for a 5G NR FR2 signal received at the beamforming antenna 115 from the base station device 300.

At 914, if the measured RSSI is greater than the stored peak RSSI, flow may proceed to 916. Otherwise, flow may proceed back to 908. For example, the RSSI measured based on the signal being received at the current angle may be compared to the stored peak RSSI to determine if the RSSI is greater than the peak RSSI and therefore represents a new peak RSSI.

At 916, the RSSI may be stored as a peak RSSI and the current angle may be stored as an angle of the line-of-sight peak. For example, the RSSI measured at the current angle at which the signal is received may be greater than the stored peak RSSI. The RSSI may be stored as the new peak RSSI, replacing the RSSI that was previously stored as the peak RSSI. The current angle may be stored as the angle of the line-of-sight peak, replacing the angle that was previously stored as the line-of-sight peak.

At 918, the peak RSSI and the angle of the line-of-sight peak may be returned. For example, the signal from the base station device 300 may have been received at all angles in the range of angles, with the beamforming antenna 115 being scanned through the entire range of angles or the beam generated by the base station device 300 being swept through the range of angles. The RSSI stored as the peak RSSI and angle stored as the angle of the line-of-sight peak may be returned, for example, from the storage 140 to the locater 130. The peak RSSI may represent the maximum RSSI that was measured while the signal was received across the entire range of angles, and the angle of the line-of-sight peak may represent the angle the signal was received at when the maximum RSSI was measured.

Figure 10:
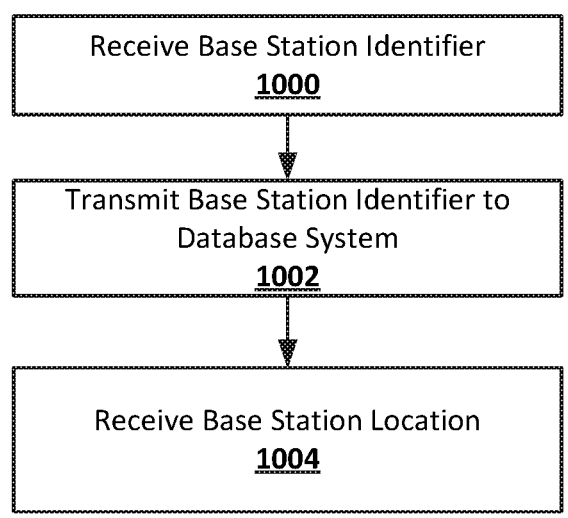
FIG. 10 shows an example of a process suitable for indoor positioning for mobile devices according to an implementation of the disclosed subject matter.

FIG. 10 shows an example of a process suitable for indoor positioning for mobile devices according to an implementation of the disclosed subject matter. At 1000, a base station identifier may be received. For example, the mobile computing device 100 may receive a base station identifier for the base station device 300. The base station identifier may be received, for example, through the broadcast signal 350 or beam 360 transmitted by the base station device 300. The base station identifier may identify the base station device 300 in the base station location database 510 of the database system 500.

At 1002, the base station identifier may be transmitted to a database system. For example, the mobile computing device 100 may transmit the base station identifier to the database system 500. The mobile computing device 100 may transmit the base station identifier using any suitable data communications link, including, for example, a link established using the radio 110 and beamforming antenna system 112 or antenna system 116, or the radio 120 and antenna system 122. For example, the data communications link may be a WiFi link, 4G LTE link, or 5G NR FR1 or 5G NR FR2 link, and the identification of the base station to obtain the location of the base station.

At 1004, a base station location may be received. For example, the database system 500 may look up the base station identifier in the base station location database 510 to determine the location of the base station device 300. The mobile computing device 100 may receive the location of the base station device 300 from the database system 500. The location may be specified in any suitable manner, such as, for example, as a latitude and longitude.

Figure 11:
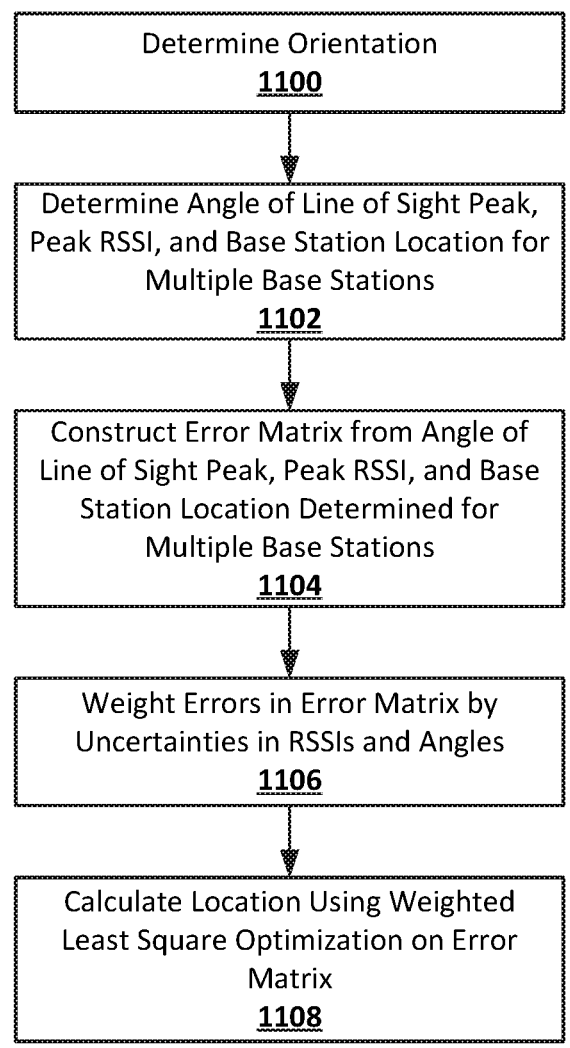
FIG. 11 shows an example of a process suitable for indoor positioning for mobile devices according to an implementation of the disclosed subject matter.

FIG. 11 shows an example of a process suitable for indoor positioning for mobile devices according to an implementation of the disclosed subject matter. At 800, an orientation may be determined. For example, the locator 130 of the mobile computing device 100 may receive orientation data from the IMU 150 and/or the camera 160. The orientation data may include, for example, readings from sensors such as accelerometers, gyroscopes, and magnetometers, and images from a camera or orientation angles determined from the images through visual odometry. The locator 130 may use the orientation data to determine an angle Φsen, which may be the angle at which the beamforming antenna 115 is oriented relative to a reference frame such as, for example, a reference frame based on the latitude and longitude lines of the earth, with the X-axis of the reference frame running parallel to the lines of latitude and Y-axis running parallel to the lines of longitude, and an origin at the center of the beamforming antenna 115 of the mobile computing device 100.

At 1102, an angle of line-of-sight peak, peak RSSI, and base station location may be determined for multiple base stations. For example, the mobile computing device 130 may determine the angle of line-of-sight peak, peak RSSI, and base station location for the base station device 300, the base station device 710, and the base station device 720. The angle of line-of-sight peak and peak RSSI for each base station device may determined in a similar manner, for example, through scanning the beamforming antenna 115 through a range of angles while measuring RSSI from a signal received from one of the base station devices or through receiving a beam being swept through a range of angles by one of the base station devices. The base station locations may be determined in a similar manner for the base station devices, for example, through a data communications link with the database system 500.

At 1104, an error matrix may be constructed from the angle of line-of-sight peak, peak RSSI, and base station location determined for multiple base stations. For example, the locator 130 may construct an error matrix using the angle of line-of-sight peak, peak RSSI, and base station location determined for multiple base station devices according to:

$$ERR_{ref1}^{X} = (X_{md}^{est} - X_{ref1}) - R_{ref1} \times \cos(\Phi peak1 - \Phi sen)$$

$$ERR_{ref1}^{Y} = (Y_{md}^{est} - Y_{ref1}) - R_{ref1} \times \sin(\Phi peak1 - \Phi sen)$$

$$ERR_{ref2}^{X} = (X_{md}^{est} - X_{ref2}) - R_{ref2} \times \cos(\Phi peak2 - \Phi sen)$$

$$ERR_{ref2}^{Y} = (Y_{md}^{est} - Y_{ref2}) - R_{ref2} \times \sin(\Phi peak2 - \Phi sen)$$

. . .

$$ERR_{refn}^{X} = (X_{md}^{est} - X_{refn}) - R_{refn} \times \cos(\Phi peak2 - \Phi sen)$$

$$ERR_{refn}^{Y} = (Y_{md}^{est} - Y_{ref2}) - R_{refn} \times \sin(\Phi peak2 - \Phi sen)$$

At 1106, the errors in the error matrix may be weighted by uncertainties in RSSIs and angles. For example, the locator 130 may weight the errors in the error matrix by uncertainties in the measurement of the peak RSSIs and angles of line-of-sight peaks for the base station devices 300, 710, and 720. Uncertainties may be based on, for example, the type of beamforming used by the beamforming antenna system 112 or by the base station devices 300, 710, and 720.

At 1108, a location may be calculated using weighted-least-squares optimization on the error matrix. For example, the locator 130 may calculate the location of the mobile computing device 100 using a weighted-least-squares (WLS) optimization to estimate the location of the mobile computing device 100, determining values for $X_{md}^{est}$ and $Y_{md}^{est}$. The locator 130 may, for example, use the Nelder-Mead algorithm, modified Powell algorithm, or Newton-CG algorithm as a WLS optimization to generate the estimate of the location of the mobile computing device 100.

An orientation of a mobile device may be determined. An angle of a line-of-sight between the mobile device and the base station may be determined based on a peak received signal strength of a signal from the base station at a beamforming antenna of the mobile device. A distance between the mobile device and the base station may be determined based on the peak received signal strength. The mobile device may calculate the location of the mobile device using the measured orientation, the angle of the line-of-sight, and the distance between the mobile device and the base station, and a location of the base station.

The signal from the base station may be a broadcast signal. The beamforming antenna of the mobile device may be scanned through a range of angles to determine which angle has the peak received signal strength at the beamforming antenna.

The broadcast signal may be a 5G NR mmWave signal.

The signal from the base station may be a beamformed signal scanned through a range of angles. A beamforming antenna system of the mobile device may determine which angle has the peak received signal strength at the beamforming antenna.

To determine an orientation of the mobile device, the orientation of the mobile device may be measured using an IMU of the mobile device.

To determine an orientation of the mobile device, the orientation of the mobile device may be measured using visual odometry on an image from a camera of the mobile device.

For each of a number of base stations, an angle of a line-of-sight between the mobile device and the respective base station may be determined based on a peak received signal strength of a signal from the respective base station at a beamforming antenna of the mobile device and a distance between the mobile device and the respective base station may be determined based on the peak received signal strength. The mobile device may construct an error matrix using the measured orientation, the angle of the line-of-sight, the distance between the mobile device and the respective base station, and a location of the respective base station for each of the number of base stations. A location of the mobile device may be calculated by using a weighted least squares optimization on the error matrix.

Errors of the error matrix may be weighted based on uncertainties of the peak received signal strengths and angles of line-of-sight for the number of base stations.

Determining of the angle of the line-of-sight may be performed using a beamforming algorithm based on a signal covariant matrix.

A mobile device may include one or more processors and a memory. The mobile device may be configured to determine an orientation of the mobile device, determine an angle of a line-of-sight between the mobile device and the base station based on a peak received signal strength of a signal from the base station at a beamforming antenna of the mobile device, determine a distance between the mobile device and the base station based on the peak received signal strength, and calculate, by the mobile device, the location of the mobile device using the measured orientation, the angle of the line-of-sight, and the distance between the mobile device and the base station, and a location of the base station.

The mobile device may include an IMU. The mobile device may be configured to determine an orientation of the mobile device by measuring the orientation of the mobile device using the IMU.

The mobile may include a camera. The mobile device may be configured to determine an orientation of the mobile device by measuring the orientation of the mobile device using visual odometry on an image from the camera.

The beamforming antenna of the mobile device may be configured to receive a 5G NR mmWave signal.

A system may include a base station and a mobile device including one or more processors and a memory storing instructions which, when executed by the one or more processors, may cause the one or more processors perform operations including determining an orientation of the mobile device, determining an angle of a line-of-sight between the mobile device and the base station based on a peak received signal strength of a signal from the base station at a beamforming antenna of the mobile device, determining a distance between the mobile device and the base station based on the peak received signal strength, calculating, by the mobile device, the location of the mobile device using the measured orientation, the angle of the line-of-sight, and the distance between the mobile device and the base station, and a location of the base station.

The signal from the base station may be a broadcast signal. The instructions may further cause the one or more processors to perform including scanning the beamforming antenna of the mobile device through a range of angles to determine which angle has the peak received signal strength at the beamforming antenna.

The broadcast signal may be a 5G NR mmWave signal.

The signal from the base station may be a beamformed signal scanned through a range of angles. The beamforming antenna system of the mobile device may be configured to determine which angle has the peak received signal strength at the beamforming antenna.

The system may include a number of base stations. The instructions may further cause the one or more processors to perform operations including, for each of the number of base stations, determining an angle of a line-of-sight between the mobile device and the respective base station based on a peak received signal strength of a signal from the respective base station at a beamforming antenna of the mobile device and determining a distance between the mobile device and the respective base station based on the peak received signal strength, constructing, by the mobile device, an error matrix using the measured orientation, the angle of the line-of-sight, the distance between the mobile device and the respective base station, and a location of the respective base station for each of the number of base stations, and calculating a location of the mobile device by using a weighted least squares optimization on the error matrix.

The instructions may further cause the one or more processors to perform operations including weighting errors of the error matrix based on uncertainties of the peak received signal strengths and angles of line-of-sight for the number of the base stations.

The instructions may further cause the one or more processors to perform operations including determining the angle of the line-of-sight using a beamforming algorithm based on a signal covariant matrix.

A location of a mobile device in a reference frame may be determined. The orientation of the mobile device may be determined with respect to the reference frame. A relative location of the mobile device with respect to a base station may be determined using a beamforming antenna. The location of the mobile device may be calculated in the reference frame using the determined orientation and relative location, and a location of the base station in the reference frame.

According to an example method, a location of a mobile device in a reference frame is determined, wherein the orientation of the mobile device is determined with respect to the reference frame, a relative location of the mobile device with respect to a base station is determined using a beamforming antenna, and the location of the mobile device is calculated in the reference frame using the determined orientation and relative location, and a location of the base station in the reference frame. An example mobile device is configured to perform this example method and an example computer program product includes instructions which, when executed by one or more processors, cause the one or more processors to perform this example method.

A computer program product may include instructions which, when executed by one or more processors, cause the one or more processors to perform operations including measuring an orientation of the mobile device with respect to a reference frame, measuring a relative location of the mobile device with respect to a base station using a beamforming antenna, calculating the location of the mobile device in the reference frame using the measured orientation and relative location, and a location of the base station in the reference frame.

A computer program product may include instructions which, when executed by one or more processors, cause the one or more processors to perform operations including determining an orientation of the mobile device, determining an angle of a line-of-sight between the mobile device and the base station based on a peak received signal strength of a signal from the base station at a beamforming antenna of the mobile device, determining a distance between the mobile device and the base station based on the peak received signal strength, and calculating, by the mobile device, the location of the mobile device using the measured orientation, the angle of the line-of-sight, and the distance between the mobile device and the base station, and a location of the base station.

A means for determining an orientation of the mobile device, a means for determining an angle of a line-of-sight between the mobile device and the base station based on a peak received signal strength of a signal from the base station at a beamforming antenna of the mobile device, a means for determining a distance between the mobile device and the base station based on the peak received signal strength, a means for calculating, by the mobile device, the location of the mobile device using the measured orientation, the angle of the line-of-sight, and the distance between the mobile device and the base station, and a location of the base station, a means for measuring the orientation of the mobile device using an IMU of the mobile device, a means for measuring the orientation of the mobile device using visual odometry on an image from a camera of the mobile device, a means for, for each of a number of base stations, determining an angle of a line-of-sight between the mobile device and the respective base station based on a peak received signal strength of a signal from the respective base station at a beamforming antenna of the mobile device and determining a distance between the mobile device and the respective base station based on the peak received signal strength, a means for constructing, by the mobile device, an error matrix using the measured orientation, the angle of the line-of-sight, the distance between the mobile device and the respective base station, and a location of the respective base station for each of the number of base stations, a means for calculating a location of the mobile device by using a weighted least squares optimization on the error matrix, a means for weighting errors of the error matrix based on uncertainties of the peak received signal strengths and angles of line-of-sight for the number of the base stations, and a means for scanning the beamforming antenna of the mobile device through a range of angles to determine which angle has the peak received signal strength at the beamforming antenna, are included.

Figure 12:
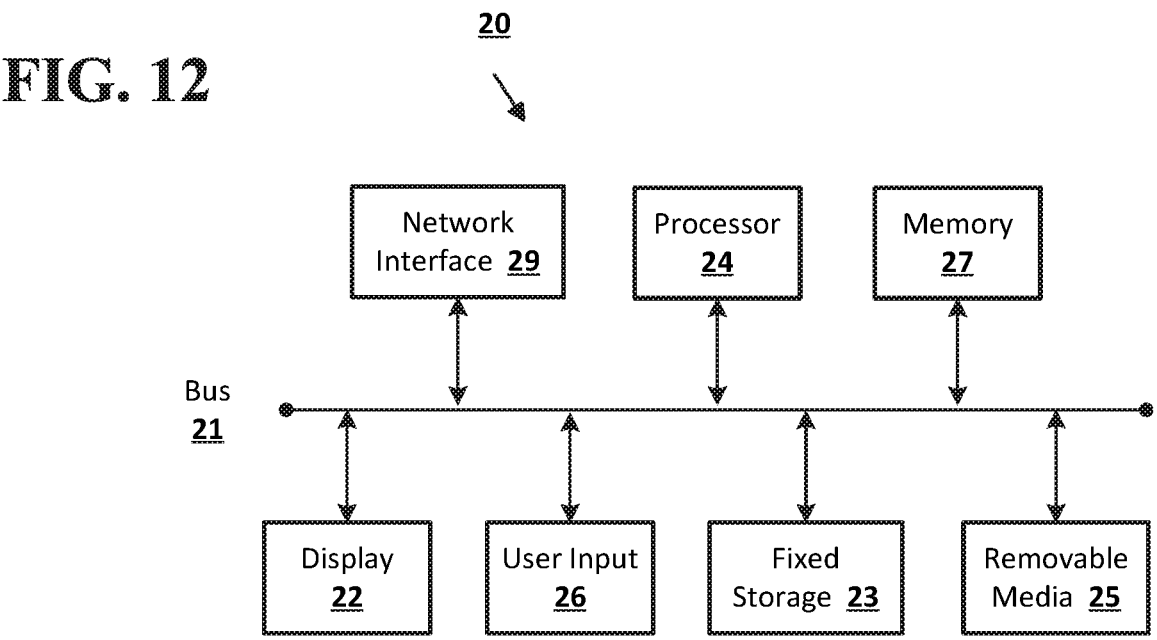
FIG. 12 shows a computer according to an embodiment of the disclosed subject matter.

Implementations of the presently disclosed subject matter may be implemented in and used with a variety of component and network architectures. FIG. 12 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 13.

Many other devices or components (not shown) may be connected in a similar manner (e.g., document scanners, digital cameras, and so on). Conversely, all of the components shown in FIG. 12 need not be present to practice the present disclosure. The components can be interconnected in different ways from that shown. The operation of a computer such as that shown in FIG. 12 is readily known in the art and is not discussed in detail in this application. Code to implement the present disclosure can be stored in computer-readable storage media such as one or more of the memory 27, fixed storage 23, removable media 25, or on a remote storage location.

Figure 13:
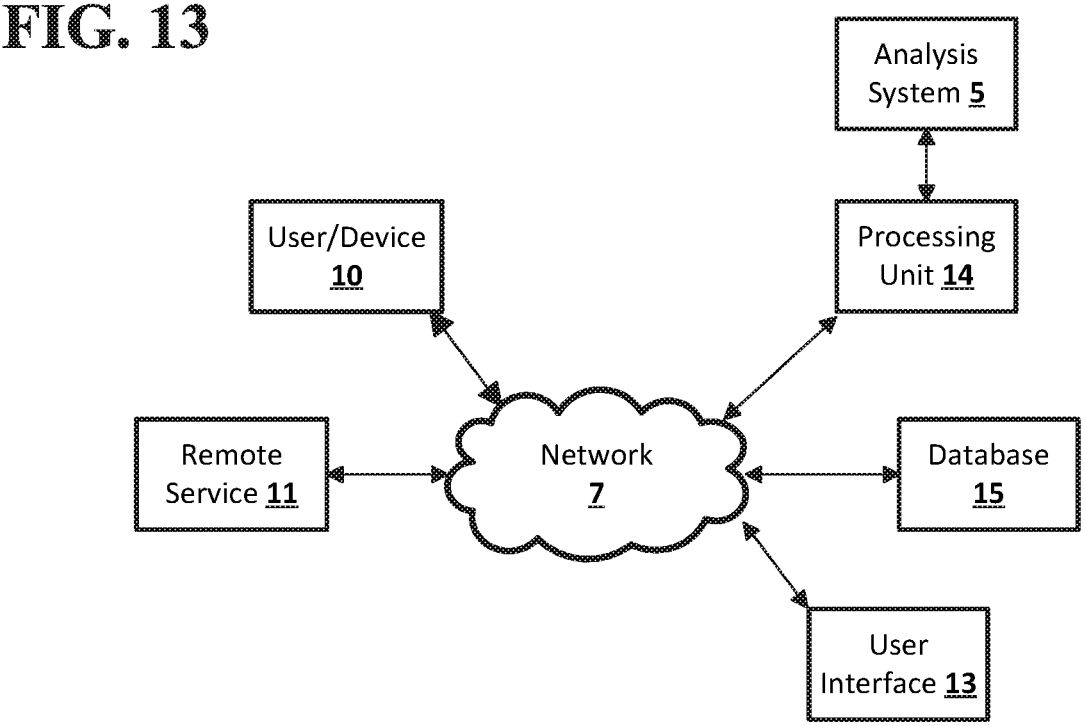
FIG. 13 shows a network configuration according to an embodiment of the disclosed subject matter.

FIG. 13 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method for determining a location of a mobile device, the method comprising:
    determining, by one or more processors of the mobile device, an orientation of the mobile device;
    determining, by the one or more processors of the mobile device and for each respective base station of a plurality of base stations, a respective angle of a line-of-sight between the mobile device and the respective base station based on a respective peak received signal strength of a signal from the respective base station at a beamforming antenna of the mobile device;
    determining, by the one or more processors of the mobile device and for each respective base station of the plurality of base stations, a respective distance between the mobile device and the respective base station based on the respective peak received signal strength;
    constructing, by the one or more processors of the mobile device, an error matrix using the measured orientation, the angles of the line-of-sight, the distances between the mobile device and the plurality of base stations, and locations of the plurality of base stations; and
    calculating, by the one or more processors of the mobile device, the location of the mobile device by at least using a weighted least squares optimization on the error matrix.

2. The method of claim 1, wherein the signal from a particular base station of the plurality of base stations is a broadcast signal, and wherein the beamforming antenna of the mobile device is scanned through a range of angles to determine which angle has the peak received signal strength at the beamforming antenna.

3. The method of claim 2, wherein the broadcast signal is a 5G NR mmWave signal.

4. The method of claim 1, wherein the signal from a particular base station of the plurality of base stations is a beamformed signal scanned through a range of angles, and wherein a beamforming antenna system of the mobile device determines which angle has the peak received signal strength at the beamforming antenna.

5. The method of claim 1, wherein determining the orientation of the mobile device further comprises measuring the orientation of the mobile device using an inertial measurement unit of the mobile device.

6. The method of claim 1, wherein determining the orientation of the mobile device further comprises measuring the orientation of the mobile device using visual odometry on an image from a camera of the mobile device.

7. The method of claim 1, further comprising weighting errors of the error matrix based on uncertainties of the peak received signal strengths and angles of line-of-sight for the plurality of the base stations.

8. The method of claim 1, wherein determining the angle of the line-of-sight is performed using a beamforming algorithm based on a signal covariant matrix.

9. The method of claim 1, further comprising:
    obtaining, via a base station location database, the location of the base station.

10. A mobile device, comprising one or more processors and a memory, the mobile device configured to:
- determine an orientation of the mobile device,
- determine, for each respective base station of a plurality of base stations, an angle of a line-of-sight between the mobile device and the respective base station based on a respective peak received signal strength of a signal from the respective base station at a beamforming antenna of the mobile device,
- determine, for each respective base station of the plurality of base stations, a distance between the mobile device and the respective base station based on the respective peak received signal strength,
- construct an error matrix using the measured orientation, the angles of the line-of-sight, the distances between the mobile device and the plurality of base stations, and locations of the plurality of base stations, and
- calculate, by the mobile device, the location of the mobile device by at least using a weighted least squares optimization on the error matrix.

11. The mobile device of claim 10, further comprising an inertial measurement unit, wherein the mobile device is configured to determine the orientation of the mobile device by measuring the orientation of the mobile device using the inertial measurement unit.

12. The mobile device of claim 10, further comprising a camera, wherein the mobile device is configured to determine the orientation of the mobile device by measuring the orientation of the mobile device using visual odometry on an image from the camera.

13. A system comprising a base station of a plurality of base stations and a mobile device including one or more processors and a memory storing instructions which, when executed by the one or more processors, cause the one or more processors perform operations comprising:
- determining an orientation of the mobile device;
- determining, for each respective base station of the plurality of base stations, a respective angle of a line-of-sight between the mobile device and the respective base station based on a respective peak received signal strength of a signal from the respective base station at a beamforming antenna of the mobile device;
- determining, for each respective base station of the plurality of base stations, a respective distance between the mobile device and the respective base station based on the respective peak received signal strength;
- constructing an error matrix using the measured orientation, the angles of the line-of-sight, the distances between the mobile device and the plurality of base stations, and locations of the plurality of base stations; and
- calculating, by the mobile device, the location of the mobile device by at least using a weighted least squares optimization on the error matrix.

14. The system of claim 13, wherein the signal from a particular base station of the plurality of base stations is a broadcast signal, and wherein the instructions further cause the one or more processors to perform operations comprising:
- scanning the beamforming antenna of the mobile device through a range of angles to determine which angle has the peak received signal strength at the beamforming antenna.

15. The system of claim 14, wherein the broadcast signal is a 5G NR mmWave signal.

16. The system of claim 13, wherein the signal from a particular base station of the plurality of base stations is a beamformed signal scanned through a range of angles, and wherein a beamforming antenna system of the mobile device is configured to determine which angle has the peak received signal strength at the beamforming antenna.

17. The system of claim 13, wherein the instructions further cause the one or more processors to perform operations comprising weighting errors of the error matrix based on uncertainties of the peak received signal strengths and angles of line-of-sight for the plurality of the base stations.

18. The system of claim 13, wherein the instructions further cause the one or more processors to perform operations comprising determining the angle of the line-of-sight using a beamforming algorithm based on a signal covariant matrix.

* * * * *